US012809953B2

(12) United States Patent
Narita et al.

(10) Patent No.: US 12,809,953 B2
(45) Date of Patent: Nov. 24, 2026

(54) INFORMATION PROCESSING APPARATUS, AUTHENTICATION SYSTEM, AUTHENTICATION METHOD, AND MEDIUM

(71) Applicant: CANON KABUSHIKI KAISHA, Tokyo (JP)

(72) Inventors: Yuki Narita, Chiba (JP); Yasuhiro Hosoda, Kanagawa (JP); Kyohei Takeda, Tokyo (JP); Mayumi Shibao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 169 days.

(21) Appl. No.: 18/789,374

(22) Filed: Jul. 30, 2024

(65) Prior Publication Data

US 2025/0045366 A1 Feb. 6, 2025

(30) Foreign Application Priority Data

Jul. 31, 2023 (JP) ................................ 2023-124708

(51) Int. Cl.
*G06F 21/31* (2013.01)

(52) U.S. Cl.
CPC .................................. *G06F 21/31* (2013.01)

(58) Field of Classification Search
None
See application file for complete search history.

(56) References Cited

U.S. PATENT DOCUMENTS

2009/0300744 A1* 12/2009 Guo ........................ G06F 21/34 726/7
2012/0084563 A1* 4/2012 Singhal ................. G07F 7/1008 713/168
2015/0046990 A1* 2/2015 Oberheide ............. G06F 21/45 726/5
2016/0044044 A1* 2/2016 Takamiya .............. H04L 63/10 726/7
2020/0250297 A1* 8/2020 Chae ....................... G06F 21/32
2023/0171355 A1 6/2023 Narita

FOREIGN PATENT DOCUMENTS

JP 2013020312 A 1/2013
JP 2018028874 A 2/2018
JP 2023037169 A 3/2023

* cited by examiner

*Primary Examiner* — Harunur Rashid
(74) *Attorney, Agent, or Firm* — Canon.U.S.A., Inc. IP Division

(57) ABSTRACT

An information processing apparatus performs a first authentication in which, from user information including a plurality of attributes for each user, a first attribute value of a user to be authenticated is, as a first factor, compared to an input value from a user, performs a second authentication in which a second attribute value of a user for which the first authentication was successful is, as a second factor, compared to an input value from a user, and allows use corresponding to privileges of an authenticated user to a user for which the second authentication was successful. When the second authentication is performed, the apparatus displays a user interface screen corresponding to information indicating a type of the second attribute value, included in the second attribute value, on the user interface, and accepts input corresponding to information indicating the type.

10 Claims, 16 Drawing Sheets

FIG. 9A1
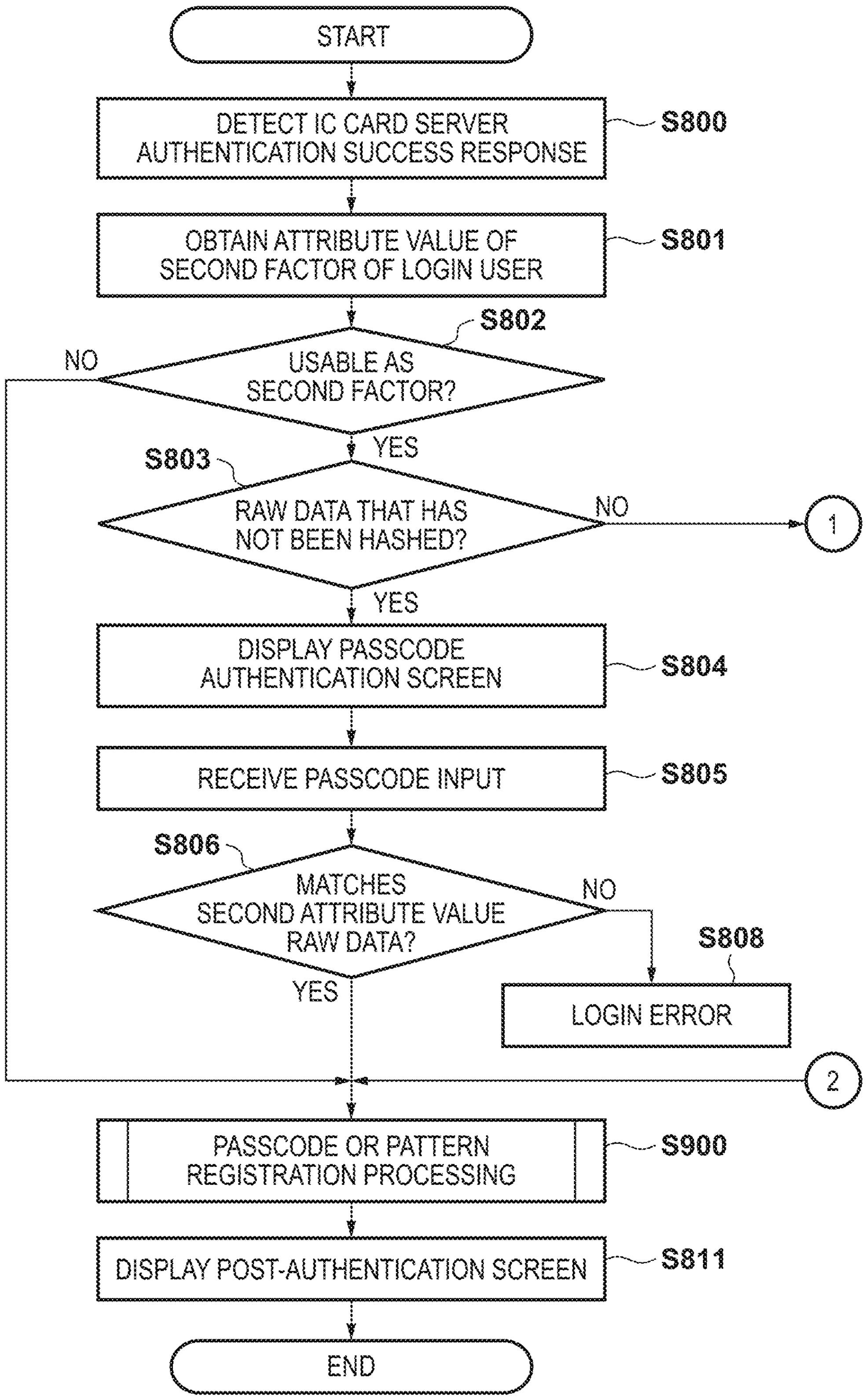

FIG. 9A2
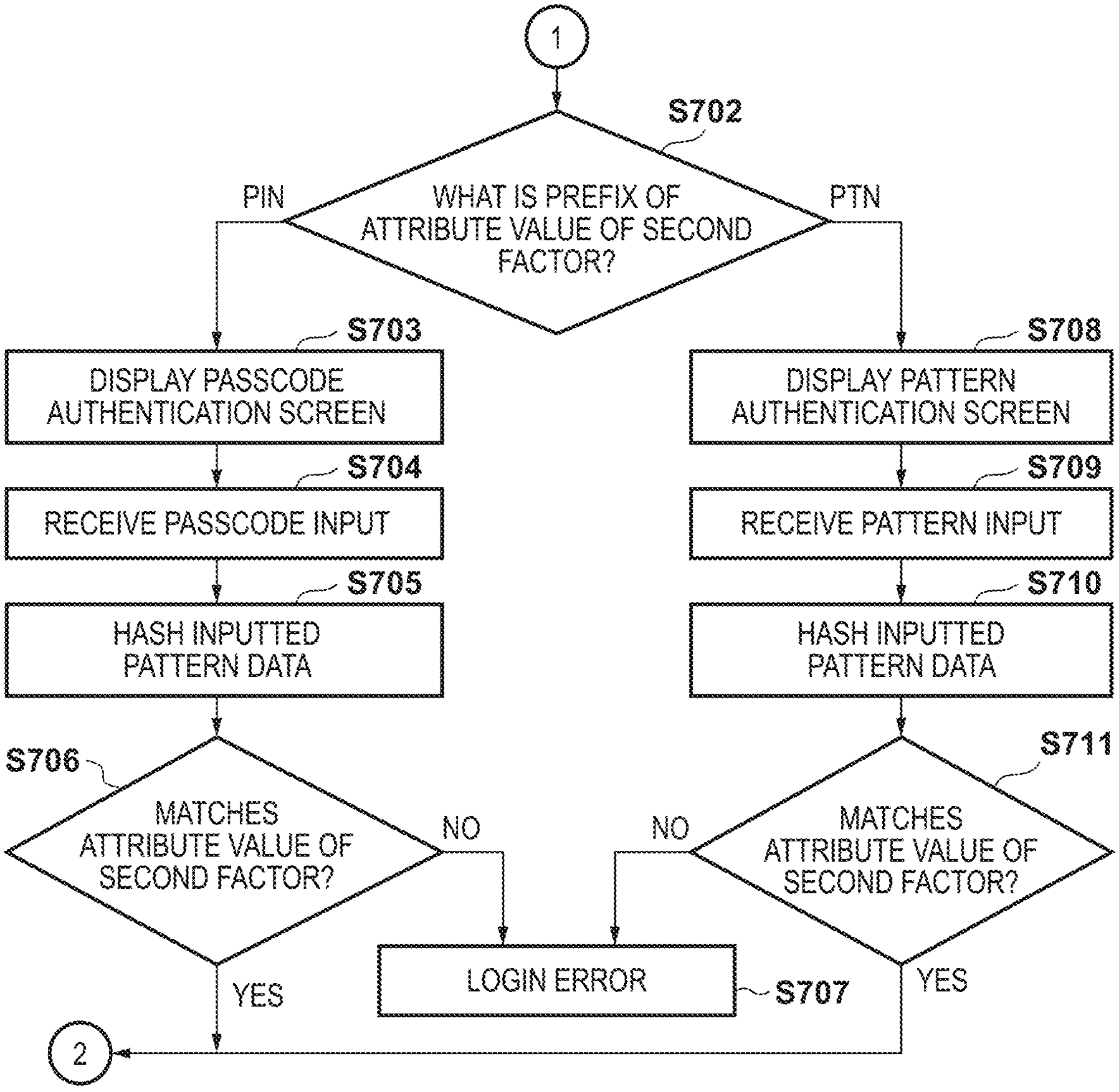

FIG. 9B1
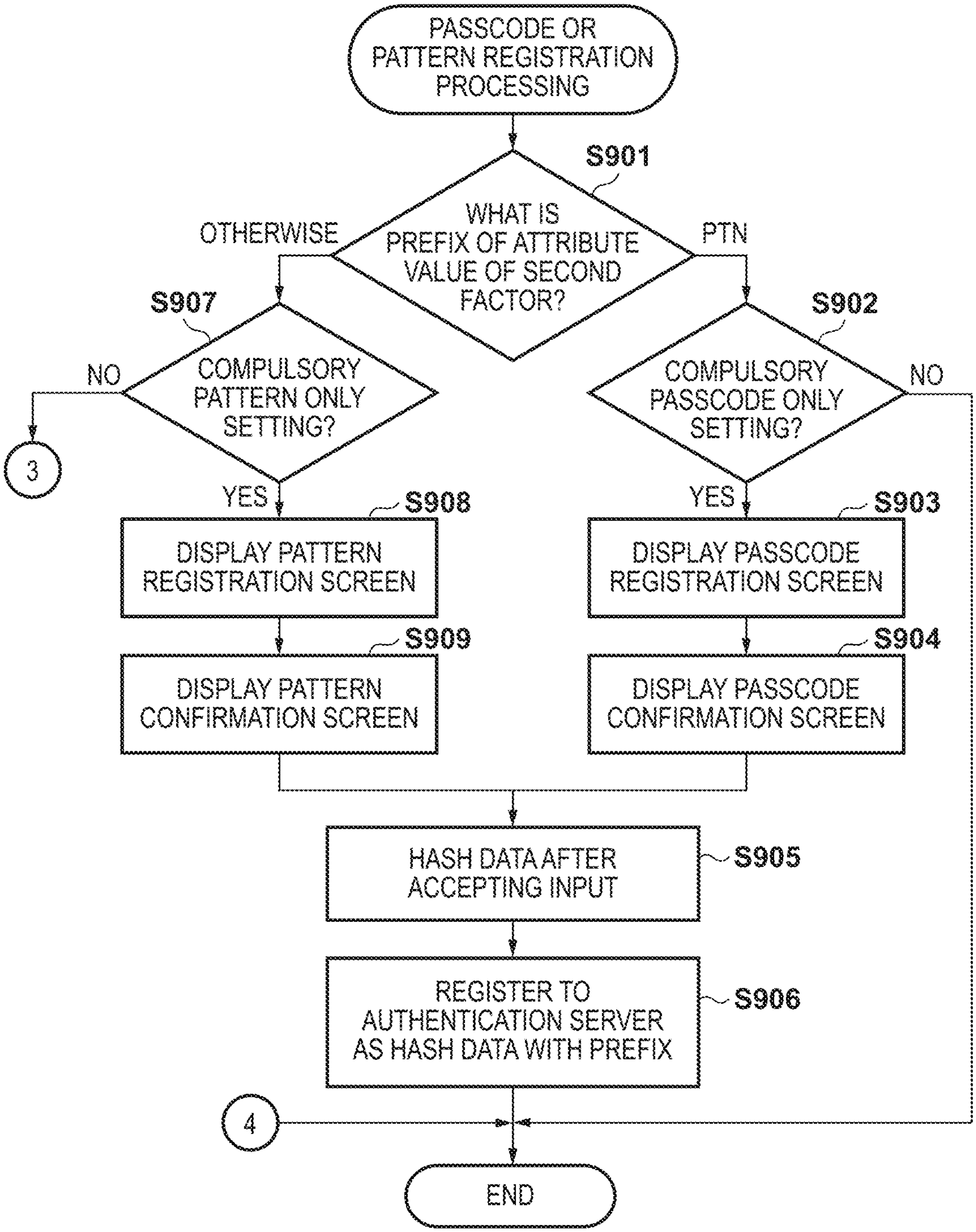

FIG. 9B2
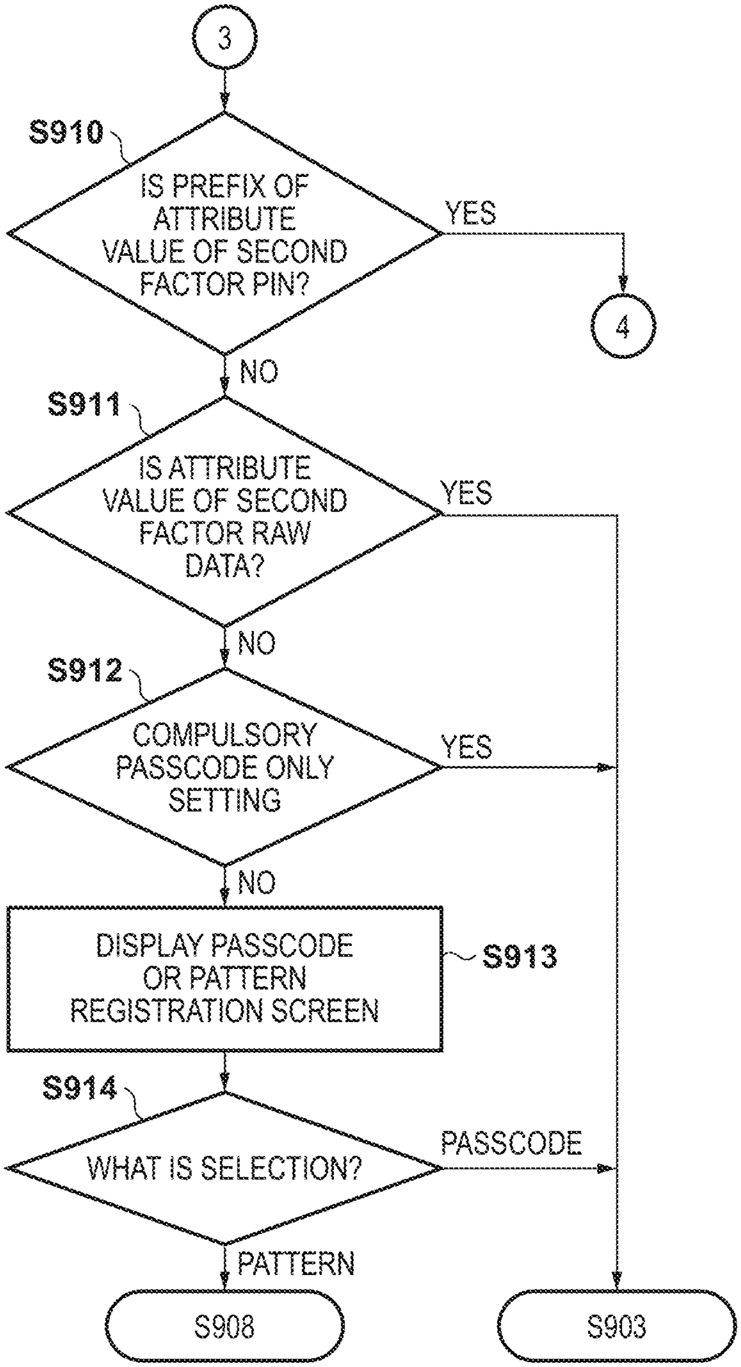

INFORMATION PROCESSING APPARATUS, AUTHENTICATION SYSTEM, AUTHENTICATION METHOD, AND MEDIUM

BACKGROUND

Field of the Disclosure

The present disclosure relates to an information processing apparatus, an authentication system, an authentication method, and a medium.

Description of the Related Art

A known technique for authentication for an image forming apparatus includes a server authentication function that executes authentication by accessing an authentication service provided by an on-premises server installed in a local network or an external cloud server. With known server authentication, user attributes included in user information registered on the server are designated in advance and authentication is performed by referencing these attributes.

Also, registering user attributes with a server is typically performed by a server administrator pre-registering an employee ID card (IC card) or the like of a user of an image forming apparatus as a first user attribute. Meanwhile, to enhance security, a technique has been proposed (see Japanese Patent Laid-Open No. 2013-020312) in which a seed server different from a server that executes authentication is installed and user information hashed using a different seed for each user is registered as a first user attribute.

Also, with recent increases in the sophistication of cyber attacks, companies are increasingly introducing multi-factor authentication that executes authentication using a first factor and a different factor when executing server authentication. In a case where a combination of server authentication and multi-factor authentication is used, a second user attribute, for example, a passcode or pattern, different from a first user attribute, for example, the IC card information described above, is designated as the second factor. In this manner, multi-factor authentication is implemented using a combination of IC card authentication and passcode authentication in which authentication is executed by the user inputting a stored string of numbers or pattern authentication in which authentication is executed by the user tracing a path on a pattern displayed on a display apparatus, for example.

As described above, a technique is known for implementing multi-factor authentication by referencing a user attribute stored by an authentication server. When executing second factor authentication, there are a plurality of authentication methods for the second factor including the passcode and pattern authentication described above. In such cases, when the image forming apparatus displays the authentication screen for the second factor, there are cases where which authentication method to use for authentication cannot be determined. Thus, in the case of multi-factor authentication using an authentication server, the administrator sets the second factor authentication method and the user executes multi-factor authentication via only the set authentication method. However, this unfortunately eliminates flexibility in terms of the authentication method and reduces the user-friendliness.

SUMMARY

According to the present disclosure, when multi-factor authentication is performed, an authentication method for authenticating one authentication factor can be selected by a user to be authenticated.

According to an aspect of the present disclosure, provided is an information processing apparatus that comprises a user interface for displaying to a user and for user input, at least one memory storing instructions, and at least one processor that is in communication with the at least one memory. When executing the instructions, the at least one processor cooperates with the at least one memory to execute processing, the processing including a first authentication in which, from user information including a plurality of attributes for each user, a first attribute value of a user to be authenticated is, as a first factor, compared to an input value from a user and authentication is performed, a second authentication in which a second attribute value of a user for which the first authentication was successful is, as a second factor, compared to an input value from a user and authentication is performed, and allowing use corresponding to privileges of an authenticated user to a user for which the second authentication was successful, and when the second authentication is performed, a user interface screen corresponding to information indicating a type of the second attribute value, included in the second attribute value, is displayed on the user interface, and input corresponding to information indicating the type is accepted.

According to another aspect of the present disclosure, provided is an authentication system that comprises an information processing apparatus and an authentication server. The information processing apparatus includes a communication device, a user interface for displaying to a user and for user input, at least one memory storing instructions, and at least one processor that is in communication with the at least one memory. When executing the instructions, the at least one processor cooperates with the at least one memory to execute processing, the processing including a first authentication in which, from user information including a plurality of attributes for each user, a first attribute value of a user to be authenticated is, as a first factor, compared to an input value from a user and authentication is performed, a second authentication in which a second attribute value of a user for which the first authentication was successful is, as a second factor, compared to an input value from a user and authentication is performed, and allowing use corresponding to privileges of an authenticated user to a user for which the second authentication was successful, when the second authentication is performed, a user interface screen corresponding to information indicating a type of the second attribute value, included in the second attribute value, is displayed on the user interface, and input corresponding to information indicating the type is accepted. The user information is stored in the authentication server connected to the communication device, the first authentication is performed by the authentication server, with an input value from a user being transmitted to the authentication server, and the second authentication is performed, with second attribute value of a user for which the first authentication was successful being obtained from the authentication server.

According to the present disclosure, when multi-factor authentication is performed, an authentication method for authenticating one authentication factor can be selected by a user to be authenticated.

Further features of various embodiments will become apparent from the following description of exemplary embodiments with reference to the attached drawings.

BRIEF DESCRIPTION OF THE DRAWINGS

FIGS. 9A1 and 9A2 show a flow diagram of when passcode only is compulsory when using multi-factor authentication.

FIGS. 9B1 and 9B2 show a flow diagram of when passcode only is compulsory when using multi-factor authentication.

DESCRIPTION OF THE EMBODIMENTS

Figure 1:
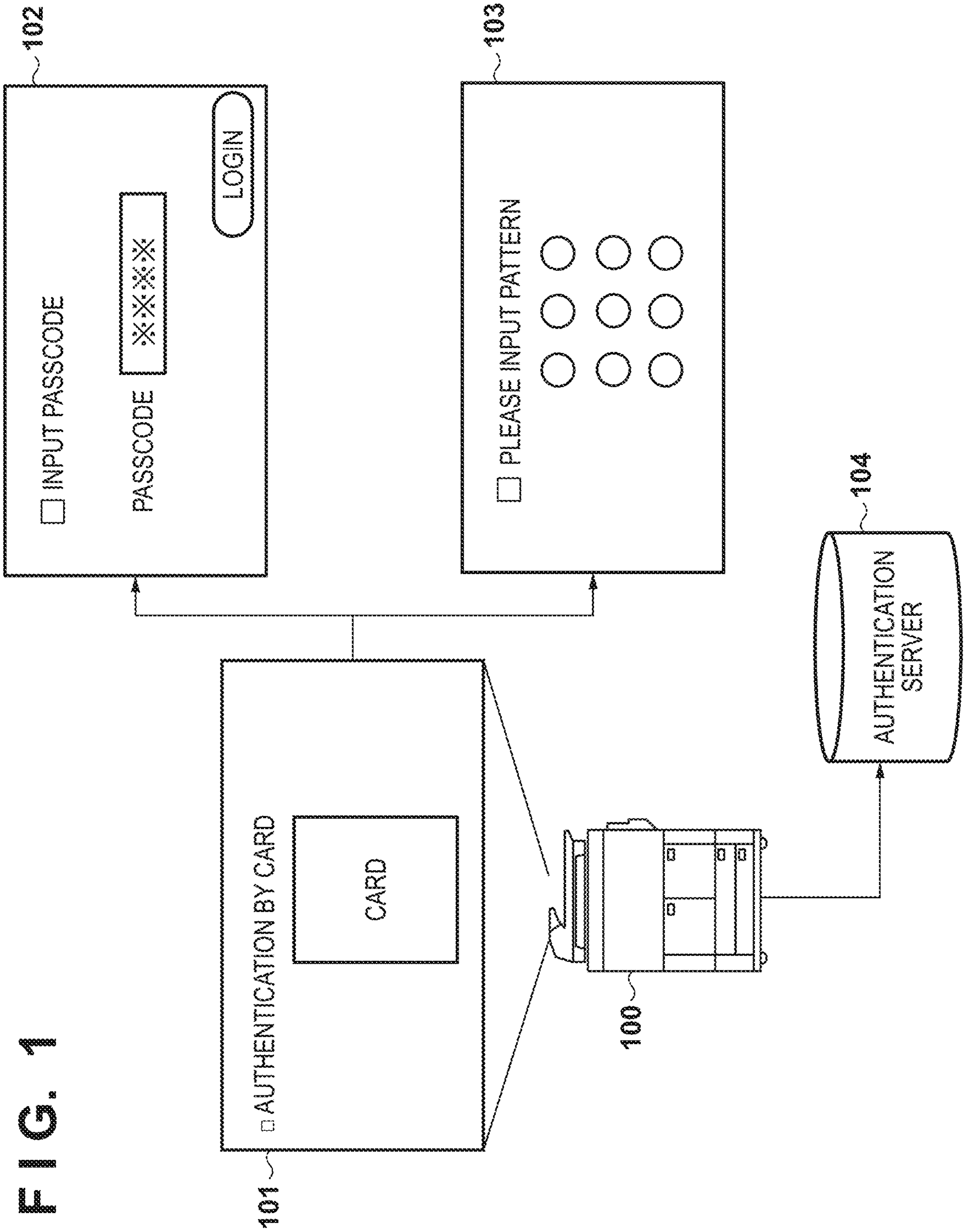
FIG. 1 is a simplified diagram illustrating the configuration of a system.

Hereinafter, embodiments will be described in detail with reference to the attached drawings. Note, the following embodiments are not intended to limit every embodiment. Multiple features are described in the embodiments, but limitation is not made to embodiments that require all such features, and multiple such features may be combined as appropriate. Furthermore, in the attached drawings, the same reference numerals are given to the same or similar configurations, and redundant description thereof is omitted.

First Embodiment

System Configuration According to Present Embodiment

FIG. 1 is a simplified diagram illustrating the configuration of an authentication system according to the present embodiment. An image forming apparatus 100 which requires user authentication to be used is a multifunction peripheral (MFP), for example, and displays an authentication screen in accordance with the authentication target and method. As illustrated in FIG. 1, as an authentication screen, a card authentication screen 101, a passcode authentication screen 102, and a pattern authentication screen 103 are displayed on an operation unit of the image forming apparatus 100 in accordance with each case. The user inputs information recorded on a card for the card authentication screen 101, inputs a passcode for the passcode authentication screen 102, and draws a pattern on a touch panel for the pattern authentication screen 103. The image forming apparatus 100 is connected to an authentication server 104 for executing authentication. The authentication server 104 is provided with a database 1041 in which user information is recorded, and the users registered in the database 1041 include users provided with identification information such as “Alice”, for example. The user information is information associated with a user, that is, information that is a collection of attributes (user attributes), and is configured of one record per user, with each field corresponding to an individual attribute.

Note that in the present embodiment described herein, IC card authentication is executed by the authentication server 104 and passcode authentication or pattern authentication is executed after identifying the user of the image forming apparatus 100.

A user registered in the authentication server 104 has IC card information registered in the authentication server 104 and a passcode or a pattern registered in association with the IC card information. Each user who, after executing IC card authentication, completes user authentication for the image forming apparatus 100 by inputting a passcode or a pattern can use the functions of the MFP 100. The image forming apparatus 100 according to the present embodiment includes a printer function, a copy function, and a scan function and further includes an edit function that enables editing of IC card information and passcodes and patterns registered in the authentication server via an authentication settings screen.

Hardware Configuration of Image Forming Apparatus 100

Figure 2:
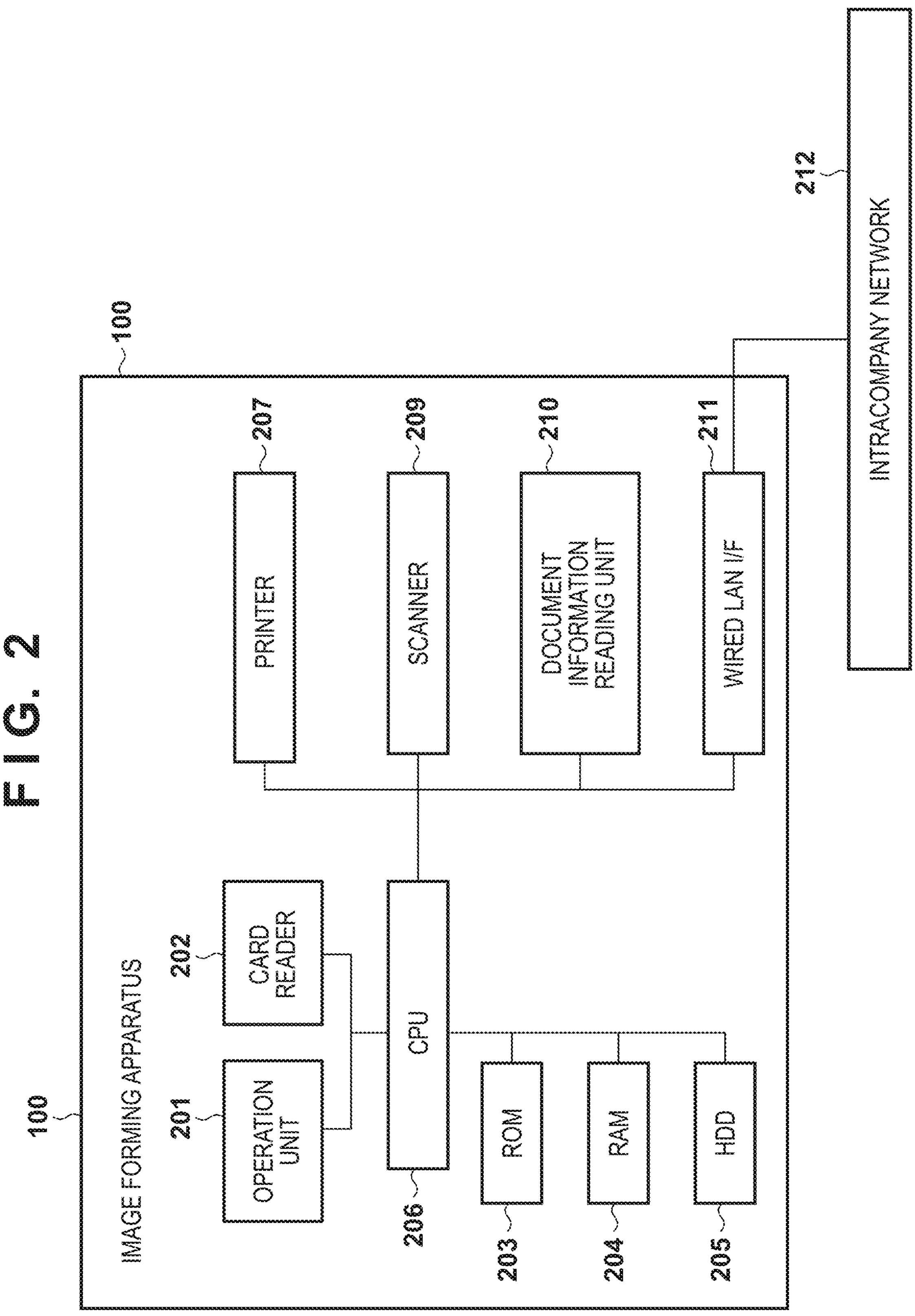
FIG. 2 is a diagram illustrating a hardware configuration.

FIG. 2 is a diagram of the hardware configuration of the image forming apparatus 100. The image forming apparatus 100 may be referred to as an information processing apparatus when emphasizing the information processing function. The image forming apparatus 100 includes a printer unit 207 and a scanner unit 209 as well as a document information reading unit 210 that reads information of scanned image data. Also provided are an operation unit 201 for operating the image forming apparatus 100, a card reader 202 for reading information such as identification information from a card upon login, and a CPU 206 for controlling the image forming apparatus 100 and these other components.

The printer unit 207 executes processing to form an image corresponding to a print job received from a personal computer (PC) connected to the image forming apparatus 100 via an intracompany network 212 on a sheet and output the sheet. The scanner unit 209 optically reads the document image and outputs it as image data.

The document information reading unit 210 reads the information (barcode, QR Code®, or pattern) embedded in the image data output by the scanner unit 209 and stores the read information in an HDD 205. Note that the document information reading unit 210 may be implemented by the CPU 206 executing a program.

The CPU 206 executes a program stored in a ROM 203 or RAM 204 and dynamically controls the various types of hardware constituting the image forming apparatus 100. In this manner, the functions provided in the image forming apparatus 100 can be implemented. The CPU 206 can send signals to the various types of hardware via a bus line and performs data communication with the various types of hardware. The CPU 206 is a processor and may be referred to as a control unit as it controls apparatuses.

The operation unit 201 is a user interface for the user using the image forming apparatus 100 to input an operation instruction and the like. Also, the operation unit 201 includes a display unit and can be operated as a touch panel.

A wired LAN interface (I/F) 211 is a communication interface for connecting to a local network configured of as a LAN, for example, the intracompany network 212 or the like. The intracompany network 212 is connected to a wide area network such as the Internet, and, via such networks, the image forming apparatus 100 can connect to a cloud service such as the authentication server 104 and receive this service.

Software Configuration According to Present Example

Next, the software configuration according to the present embodiment will be described with reference to FIG. 3.

Software Configuration of Image Forming Apparatus 100

Figure 3:
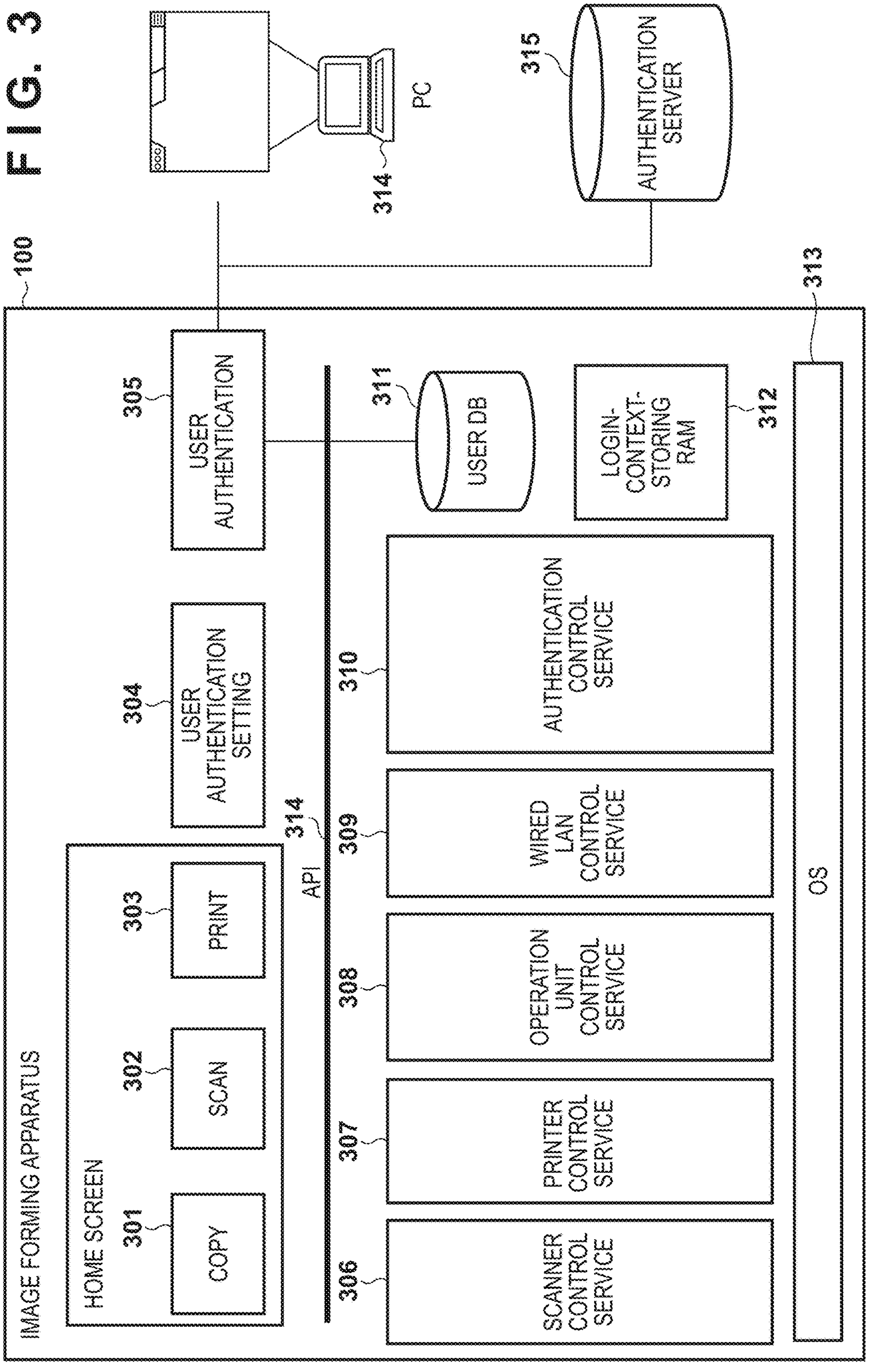
FIG. 3 is a diagram illustrating a software configuration and a data region managed by software.

FIG. 3 is a diagram of the software configuration of the image forming apparatus 100. The image forming apparatus 100 of FIG. 3 is controlled by an operating system (OS) 313, and on the OS 313, a piece of software forming a platform for executing an application, for example, a language processing program including a library, is executed. Applications running on this platform include a copy application 301, a scan application 302, a print application 303, a user authentication setting application 304, a user authentication application 305. Note that hereinafter, “application” may be omitted from each application name. Also, the copy application 301, the scan application 302, the print application 303, the user authentication setting application 304, and the user authentication application 305 provide a user interface that can be operated by the user. Each application communicates with various types of control services used by the application via an application program interface (API).

The various types of control services correspond to a module group including a scanner control service 306, a printer control service 307, an operation unit control service 308, a wired LAN control service 309, and an authentication control service 310. Each service provides a service such as a scanner, a printer, an operation unit, a wired LAN, or user authentication for an application or a web application. A user DB 311 storing user information and a login-context-storing RAM 312 for storing login context of the user that executed login are also provided. The user authentication 305 performs user authentication using the authentication server 104 or the authentication control service 310.

The user authentication 305 provides each function including login authentication, server authentication, and remote authentication for logging into the image forming apparatus 100. Also, with local authentication, the information of the user DB 311 is used to perform user authentication, and management of the login user including registering a new user, changing user information, and the like is performed. Also, when executing server authentication, the external authentication server 104 is accessed and the user information registered in the authentication server 104 is referenced to execute authentication processing. User information management also includes managing the user information registered in the authentication server 104. The management of the login user and the settings relating to the various types of authentication can be set by remotely accessing the user authentication 305 via the user authentication setting application 304 or a PC 314 after logging into the image forming apparatus 100. In this case, the user authentication 305 functions as a service for the PC 314. With remote authentication, the required information is input on an authentication screen displayed by a web browser and authentication is performed, for example.

Each function described above can be implemented via a program described using assembly language, C, C++, Visual C++, Perl, Ruby, JAVA®, JAVABeans, JAVABApplet, JAVAScript, or the like. Instead of such legacy programming languages, another language such as an object-oriented programming language may also naturally be used. These programs can be distributed stored in a storage medium readable by the apparatus.

The user authentication processing supported by the image forming apparatus 100 according to the present embodiment include card authentication, username and password authentication, passcode authentication (password authentication), pattern authentication, and a combination thereof. First, authentication screens of these types of authentication processing will be described.

Card Authentication Screen

Figure 4A:
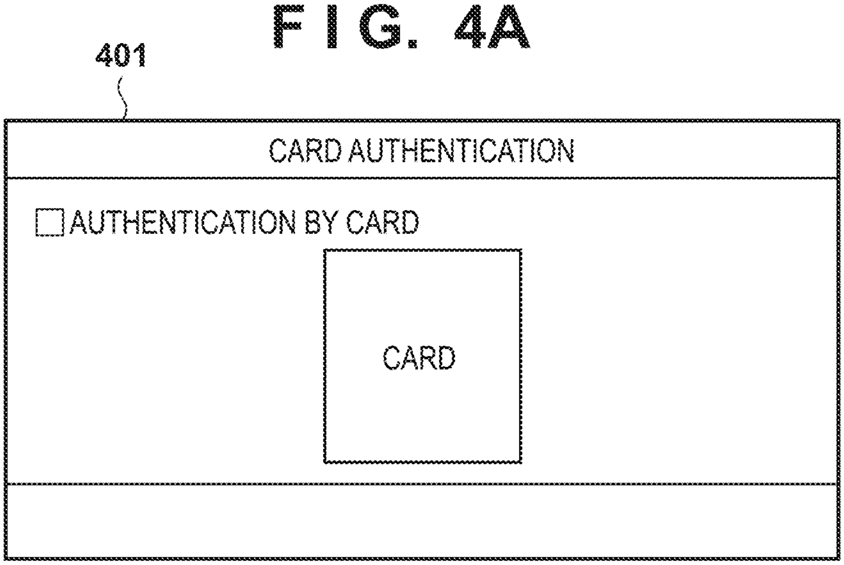
FIGS. 4A, 4B, 4C, and 4D are diagrams illustrating examples of authentication screens provided by an image forming apparatus.

Card authentication is user authentication processing in which the information electronically, magnetically, or optically recorded on a card, that is, the card identification information (card ID), is read by the card reader 202 provided in the image forming apparatus 100. FIG. 4A illustrates a card authentication screen 401, which is a user interface screen. The user touches the card in possession against the card reader 202 provided in the image forming apparatus 100. The image forming apparatus 100 reads the card ID from the card reader 202. A query for the obtained card ID is sent to the authentication server, and the card ID associated with the user account is searched for. In a case where the result of the search is that the card ID is registered, authentication processing for the registered user account is executed. In a case where the card ID read by the card reader 202 is unregistered, an authentication error occurs, and the card authentication screen 401 is displayed again. Note that here, server authentication is described, but in the case of local authentication, the server authentication is similar except that the user DB 311 is used in authentication instead of the authentication server 104.

When card authentication is used, card ID is pre-registered in the authentication server 104. The card ID registration method may be a method in which the card ID is directly input using the operation unit 201 of the image forming apparatus 100 or a method in which the card ID is registered by the card ID being read by the card reader 202. When registering a card ID, by inputting the username and password for the image forming apparatus 100, user confirmation processing is executed. The user information (username and password) pre-registered by the user confirmation processing (user authentication processing) is identified, and the card ID is associated with the identified user information. As information registered in the authentication server 104 is used as the authentication information to be used in user confirmation processing, in a case where the user information is not registered in the authentication server 104, a user confirmation error occurs. In this case, user information is pre-registered in advance.

When user confirmation is successful, the association between the user account and the card ID is executed by the user touch the card to be registered against the card reader 202, and from then on, the user can execute the card authentication services.

User Account Authentication

Figure 4B:
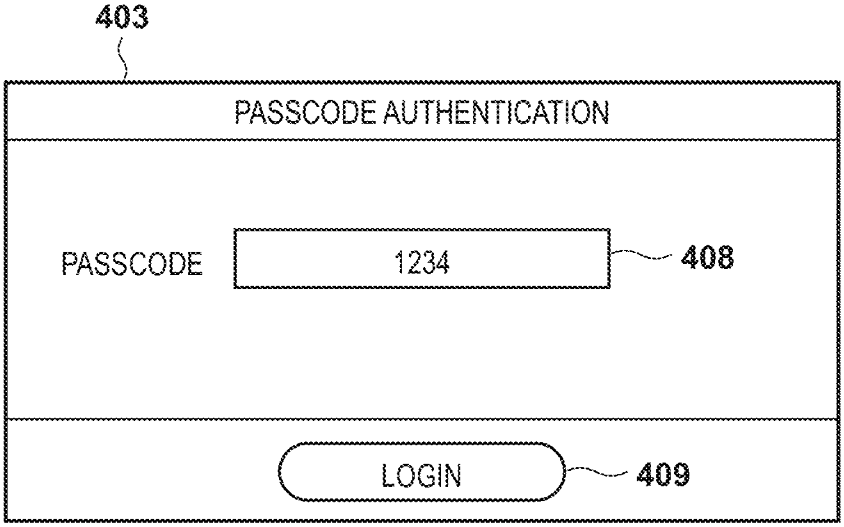

User account authentication is an authentication method in which a username (user identification information) and a password are input via a local UI of the image forming apparatus 100 or a remote UI such as a PC or a mobile terminal to authenticate a user. Local UI is a UI displayed on the operation unit 201 of the image forming apparatus 100, and remote UI is the displayed UI when a screen corresponding to the local UI is provided in the browser of a terminal from the HTTP server of the image forming apparatus 100. In any case, when the user information or the like is input from the UI and user authentication is performed, login is enabled. In the example described below, authentication is performed by the authentication server 104 after a login from the local UI. FIG. 4B illustrates a user account authentication screen 402, which is a user interface screen for this.

The user of the image forming apparatus 100 inputs a username 405 and a password 406 on the user account authentication screen 402 displayed on the local UI and presses a login button 407. In response to this, the input user information is transmitted to the authentication server 104 and compared against the username and the password registered in the authentication server 104. In a case where the user account and the password information are registered, the authentication processing is successful, and a response indicating this is returned to the image forming apparatus 100. This enables use of the image forming apparatus 100 to the login user.

In a case where either the username or the password is not registered in the authentication server 104, an authentication error occurs and the authentication server 104 reports this to the image forming apparatus 100. In the image forming apparatus 100, after an error is displayed, the user account authentication screen 402 is displayed.

Also, when the authentication server 104 is used for the user account authentication, authentication information including a username and a password associated with the username is registered in the authentication server 104. At this time, it is assumed that a user that can register authentication information is an administrator user with administrator privileges.

Passcode Authentication

Figure 4C:
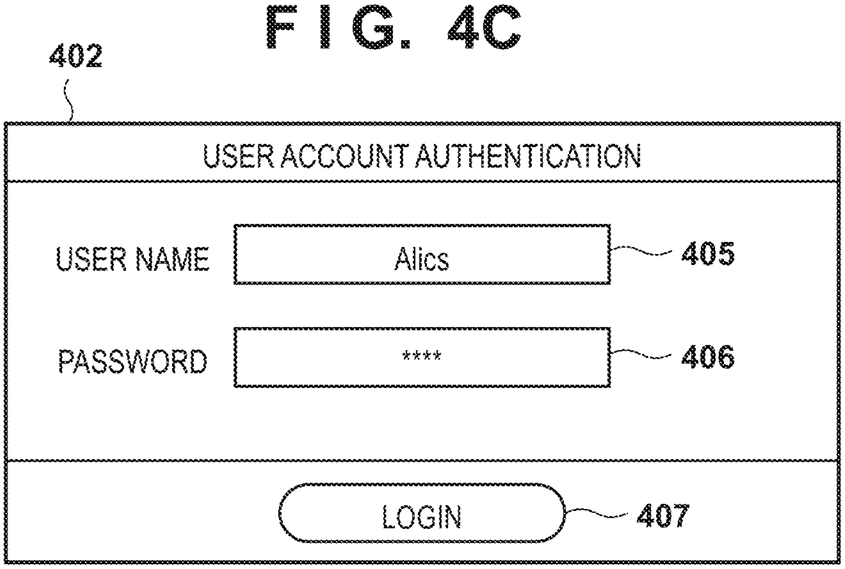

Passcode authentication is an authentication method in which, when authenticating using the local UI of the image forming apparatus 100 or using a remote UI from a PC or a mobile terminal, a passcode is input to log into the image forming apparatus 100. A passcode authentication screen 403 for this is illustrated in FIG. 4C.

The flow of the authentication processing and the user registration processing may be the same as the user account authentication. In other words, the passcode is registered in association with a username as a part of the user information. In the present embodiment, the passcode authentication is assumed to be used in combination with IC card authentication or user account authentication, and in a case where the passcode authentication is set as the multi-factor authentication to be performed after the success of IC card authentication or user account authentication, the user is requested to perform the passcode input processing. The authentication server 104 performs user authentication by comparing the passcode registered in association with the user identified by the card authentication or the user account authentication and the input passcode. Handling of the authentication result may be as in the user account authentication.

Pattern Authentication Service

Figure 4D:
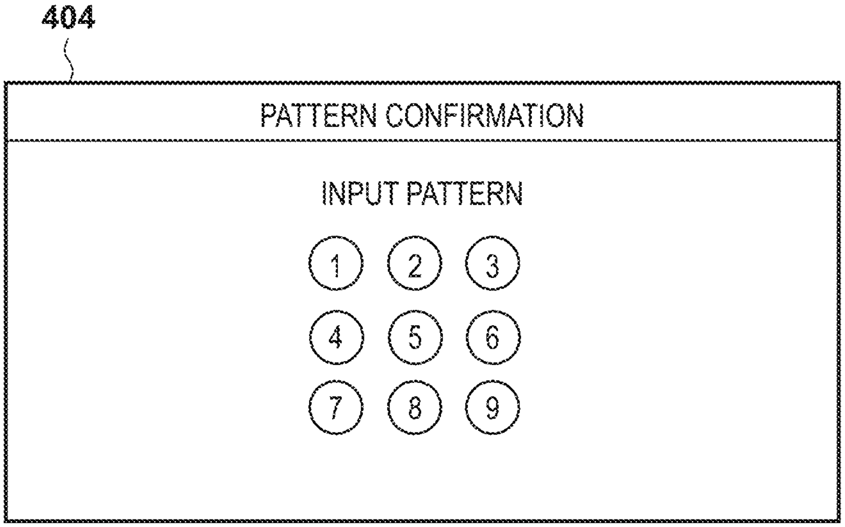

Pattern authentication used in the present embodiment will now be described. FIG. 4D illustrates a pattern authentication screen 404. In pattern authentication, a pattern used in pattern authentication is pre-registered by the user via the user authentication setting application 304. The user traces the path of the pattern on the pattern authentication screen 404 via the touch panel of the operation unit 201 of the image forming apparatus 100. The input pattern is compared with the pattern transmitted to and registered in the authentication server 104. If they match, a response indicating this is transmitted to the image forming apparatus 100, and use of the functions of the image forming apparatus 100 is enabled.

If it does not match the registered pattern, an authentication error occurs, and the pattern authentication screen 404 is displayed again. Note that, the timing of when the pattern authentication processing is started corresponds to a time after the user has finished the pattern input processing and the finger has separated from the touch panel.

The pattern is configured of rows of points, for example. Thus, regarding the points forming the pattern, numbers such as those illustrated on the pattern authentication screen 404 are associated with the points and internally stored. In FIG. 4D, numbers are displayed, but numbers may not be displayed on the screen. When transmitting the pattern to the authentication server 104, a string of numbers corresponding to the numbers associated with the points the path of the input pattern passes through arranged in order of the path is transmitted as the pattern. If the string of numbers registered as the pattern matches the input string of numbers, pattern authentication is determined to be a success. If they do not match, pattern authentication is determined to be a failure.

User Information registered in Authentication Server

Table 1 illustrates an example of user information registered in the authentication server 104. Note that the items included in the user information are user attributes, and the values may be referred to as attribute values.

TABLE 1

User information registered in authentication server

| Username | Password | First factor (card ID) | Second factor (passcode or pattern) | Use privilege for image forming apparatus |
|---|---|---|---|---|
| Alice | ******** | 4R47158E . . . | PIN: xuyfds444ji | Administrator |
| Bob | ******** | 045F32D8 . . . | PTN: jidunds88-7654321 | General |
| Carol | ******** | 06R55139 . . . | | General |
| Dave | ******** | 456G5340 . . . | | General |

"Username" and "Password" in Table 1 are referenced when executing the user account authentication and the card authentication described above. "First factor (card ID)" in Table 1 is referenced when executing card authentication.

"Second factor (passcode or pattern)" is referenced when executing passcode authentication or pattern authentication. Passcode and patterns are stored in the same region (field) of the user information and are differentiated by the prefix. Note that in the present embodiment, as illustrated in Table 1, a card ID attribute is used as the first factor of the multi-factor authentication, and a passcode or a pattern attribute is used as the second factor. The passcodes and patterns registered in the authentication server 104 via the image forming apparatus 100 are converted to hash values using a hash function and stored in a "prefix: hash value" format. The prefix indicates the type of the registered information. For example, the prefix "PIN" means passcode data, and the prefix "PTN" means pattern data. In a case where a passcode is directly input at the authentication server 104, the passcode is registered without being hashed and without attaching a prefix.

When performing multi-factor authentication, if the first factor authentication is successful, the image forming apparatus 100 receives a response indicating this from the authentication server 104. The prefix of the second factor is also obtained with this response. When the obtained prefix is referenced and found to be "PIN", the second factor is determined to be a passcode and the passcode authentication screen 403 is displayed.

When the prefix of the obtained second factor is referenced and found to be "PTN", the second factor is determined to be a pattern and the pattern authentication screen 404 is displayed.

Note that when a value for the "passcode or pattern" attribute is registered from the image forming apparatus 100, whether it is a passcode or a pattern is selected before it is registered. Thus, the image forming apparatus 100 can transmit information indicating which is the registration target together with the registration target, passcode or pattern, to the authentication server 104. Here, at the authentication server 104, a prefix according to this information is added and the passcode or pattern is registered.

Also, when the administrator of the authentication server 104 directly inputs a value for the second factor instead of registration from the image forming apparatus 100, the value is stored in a prefix-less format such as "7654321". The seed information required for the hash values is calculated from the username in Table 1 and the hash values are calculated using the values of the second factor of the hash target and the seed information.

"Use privilege for image forming apparatus" in Table 1 is referenced when displaying the information that can be set with the user authentication setting application 304. The user privileges indicates the corresponding user privileges.

Function-Based Authentication

When the image forming apparatus 100 is used, an authentication screen such as those illustrated in FIGS. 4A to 4D is displayed, and a device authentication mode for executing user authentication processing and a function-based authentication mode are provided to the user. In the function-based authentication mode, a user authentication screen is displayed when using an application stored by the image forming apparatus 100. In the function-based authentication mode, for executing authentication for each application, for example, the administrator can set the settings so that authentication processing is executed when using the copy application 301, but so that the print application 303 can be used without executing authentication processing. Even if the target to be used by the authenticated user is different, user authentication may be performed in a similar manner for either mode. The server authentication described in the present embodiment is assumed to be used for both the device authentication mode and the function-based authentication mode.

Authentication Settings Screen

Figure 5A:
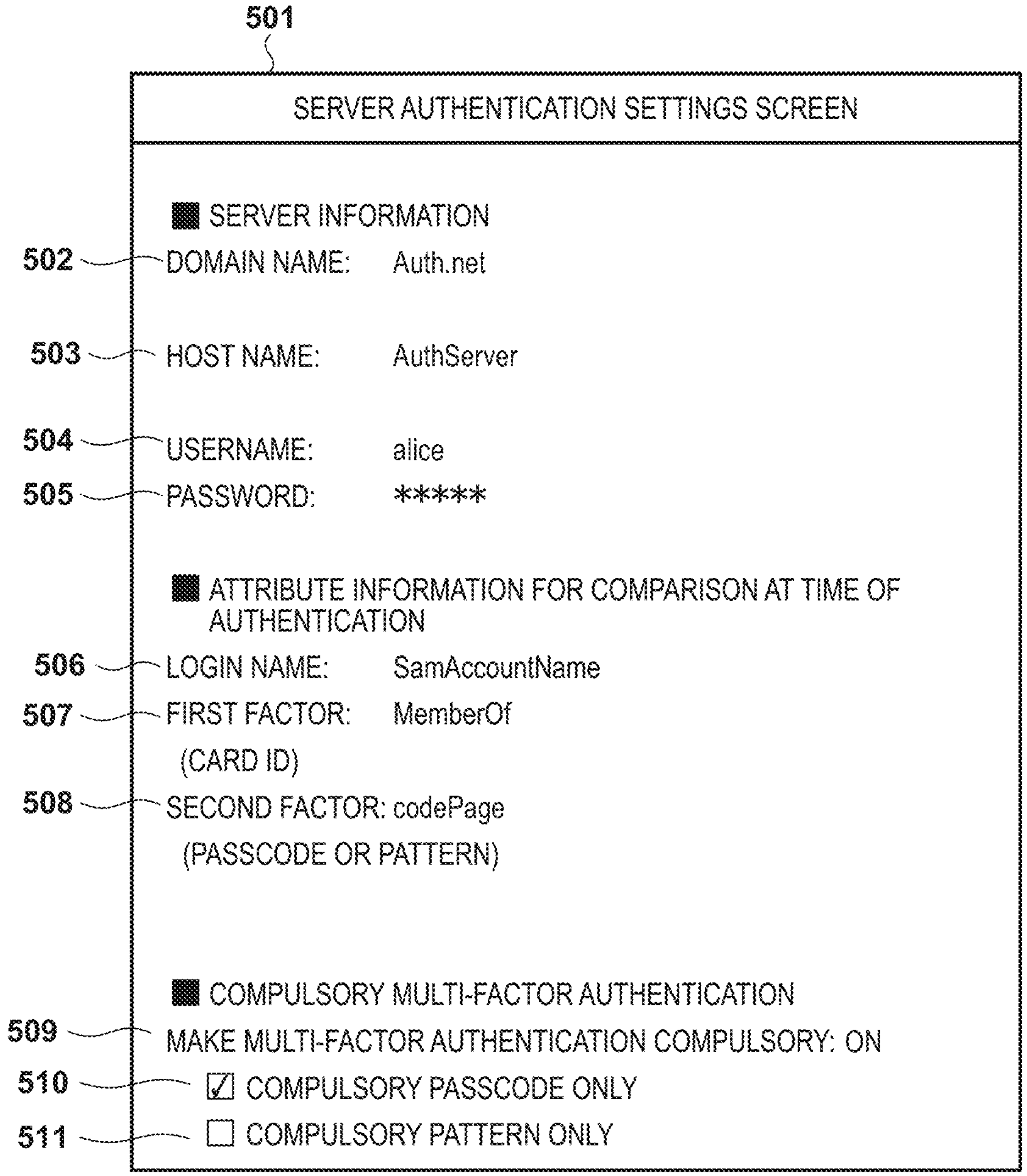
FIGS. 5A and 5B are diagrams illustrating settings screens for user information required for server authentication.
Figure 5B:
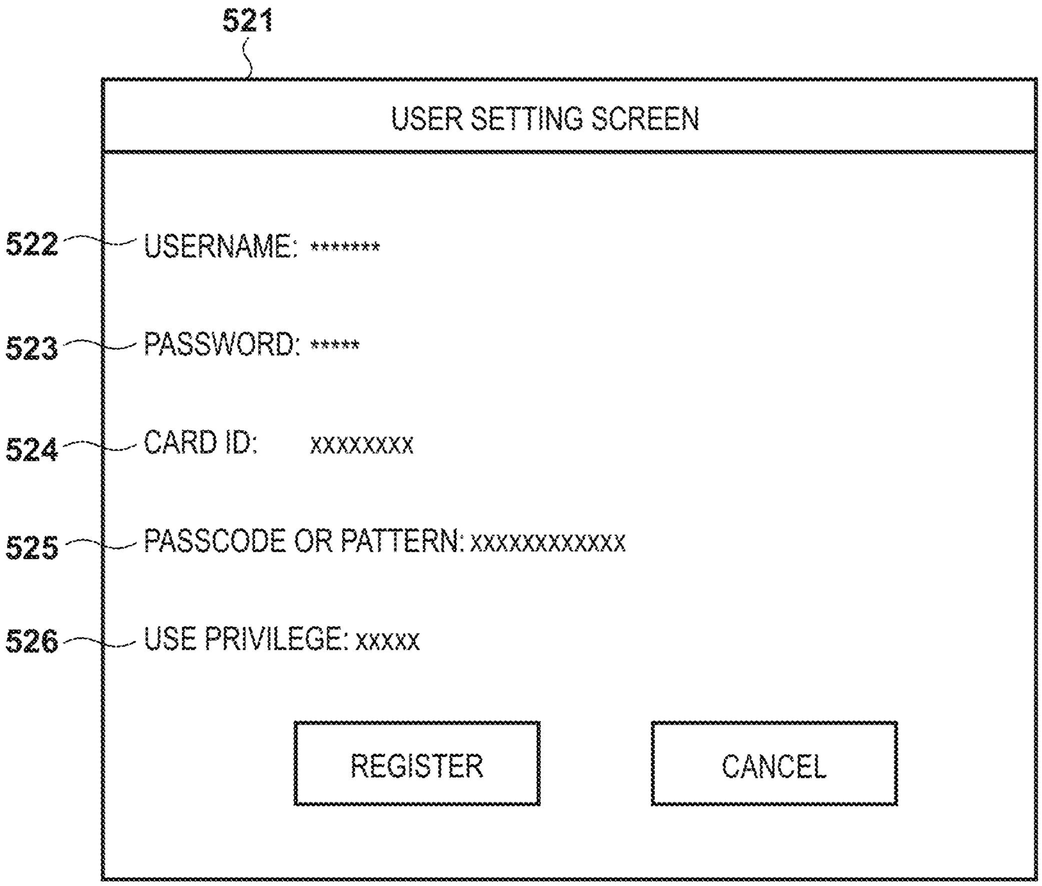

A server authentication settings screen 501 displayed by the image forming apparatus 100 will now be described using FIGS. 5A and 5B. The present embodiment described herein is premised on the user authentication using multi-factor authentication. Thus, the settings described using FIGS. 5A and 5B are also premised on multi-factor authentication. However, another authentication method may be able to be selected. The server authentication settings screen 501 is displayed in response to the user authentication setting application 304 being run and server authentication settings being set. Note that the user authentication setting application 304 is also one of the applications of the image forming apparatus 100 and can thus be used by authenticated users. For example, in the initial state of the image forming apparatus 100, the image forming apparatus 100 can be logged into with predetermined user information registered in the authentication server 104, and the user authentication setting application 304 can be used in the logged in state.

The server authentication settings screen 501 includes items including server information 502 relating to the server that executes server authentication, attribute settings 506 used for comparison when performing server authentication, compulsory multi-factor authentication settings 509 for setting whether multi-factor authentication is compulsory when performing server authentication, and the like. These settings are set by the administrator user with administrator privileges.

When the image forming apparatus 100 uses the authentication server, the server information 502 is an item for setting which server belonging to which domain to use. The server information 502 identifies the target authentication server via a domain name 502 where the domain the server belongs to is set and a host name 503 of the authentication server and implements access of the authentication server by performing a network search. Also, when access is performed, a username 504 and a password 505 corresponding to user account information of a user with administrator privileges registered in the authentication server 104. In this manner, when accessing the authentication server, user account information is transmitted and authentication processing using the authentication server is executed.

When accessing the authentication server 104, authentication processing using the setting values of the username 504 and the password 505 is first executed. After successful authentication, using the authentication service using the authentication server 104, the card authentication, user account authentication, passcode authentication, and pattern authentication described above for the image forming apparatus 100 can be performed. User information registration is also enabled.

For the attribute settings 506 used for comparison in authentication, which attribute value of the user information to compare when using each factor in authentication processing is set. When using user account authentication, the value of the attribute set as the login name 506 is referenced and server authentication is executed. In the case of setting a username and password as the user information targeted for user account authentication, information indicating the username and password (for example, a symbol allocated to each item) is set in the login name 506.

Also, in the case of multi-factor authentication, a first factor 507 and a second factor 508 and user information attributes used by these are set. When using card authentication as the first factor, as the first factor 507, information indicating a "card ID" attribute, for example, an index of card ID attributes in the user information or the like, is set. When authentication is performed, the attribute value of the card ID is referenced, and server authentication is executed. When a passcode or a pattern authentication is used as the second factor, information indicating a "passcode or pattern" attribute is set as the second factor 508. Also, when performing user authentication, the input value and the value of the attribute set for the authentication target user are referenced and server authentication is executed. Also, the set attribute information is referenced when executing server authentication and also referenced when registering user information in the authentication server, and the value (attribute value) of the item set with the login name 506 is referenced when user confirmation to identify the registration target user is performed. After user confirmation is performed, when updating another item of the user information or executing registration processing, each attribute information set in the first factor 507 and the second factor 508 are referenced, and registration processing for the authentication server 104 is executed. In user confirmation, if the target user is unregistered, new registration may be performed, and if already registered, update may be performed.

Referring to the server authentication settings set in FIG. 5A at the time of registration of the user information may be performed in a case where a value of an item name corresponding to the server authentication settings screen is input such that the input item name is "login name", "first factor", "second factor", and the like on the settings screen of the user information.

In the case of displaying the names of each item in Table 1 and setting the value for each item, the server authentication settings set as illustrated in FIG. 5A when setting the user information may not be referenced.

The compulsory multi-factor authentication settings 509 is an item that can be set in a case where the first factor 507 and the second factor 508 described above are set to enabled. Set to enabled means that an attribute of the user information is set in each item. In a case where the first factor 507 and the second factor 508 are set to disabled, the compulsory multi-factor authentication settings 509 is masked. With these settings, the administrator can preset multi-factor authentication to be required when executing server authentication. In a case where the compulsory multi-factor authentication settings 509 is enabled, authentication of a user for which registration of an attribute selected as a second factor has not been executed is not executed, and a screen prompting the user to execute second factor attribute value registration is displayed. If the second factor is "passcode or pattern", for example, when the authentication is executed, a screen prompting the user to execute registration processing for that value is displayed. Also, if the compulsory multi-factor authentication settings 509 is off, user authentication may be performed using user account authentication.

A compulsory passcode only setting 510 and a compulsory pattern only setting 511 can only be set when the compulsory multi-factor authentication settings 509 is enabled. When making multi-factor authentication compulsory with these items, an item that has to be input by the user can be set. In a case where the compulsory passcode only setting 510 is enabled, authentication of a user with an unregistered passcode and a registered pattern is prohibited, and a passcode registration screen is displayed upon user authentication. In this case, after passcode registration has been executed, the registered pattern is overwritten with a passcode. In a case where the compulsory pattern only setting 511 is enabled, authentication of a user with an unregistered pattern and a registered passcode is prohibited, and a pattern registration screen is displayed upon user authentication. In this case, after pattern registration has been executed, the registered passcode is overwritten with pattern information indicating a pattern. Note that in FIGS. 5A and 5B, the compulsory passcode only setting 510 and a compulsory pattern only setting 511 are checkboxes, but in the present embodiment, these settings are set to either only one being on or both being off, with a setting of both being on being able to be selected. The user interface may be configured so that both cannot be simultaneously selected.

The value of each item set in the server authentication settings screen 501 is stored in a non-volatile memory such as the HDD 205, the ROM 203, or the like and is referenced as necessary upon user authentication or the like. The stored information may be referred to as server authentication settings information. The server settings information may be predetermined default settings and not set by the administrator user. In the default settings, for example, the login name may be a username and a password, the first factor may be a card ID, the second factor may be a passcode or a pattern, and the compulsory multi-factor authentication settings 509 may be off.

Second Factor Registration

FIG. 5B is an example of a user settings screen 521 displayed when registering or updating user information. The administrator user can register the user information in Table 1 in the authentication server 104 via the user settings screen 521. When the administrator user runs the user authentication setting application 304, sends a user setting instruction, and completes administrator privileges authentication, the user settings screen 521 of FIG. 5B is displayed.

On the user settings screen 521, the values for a username 522, a password 523, a card ID 524, a passcode or pattern 525, and a use privilege 526 can be set for each user. The set values are registered as user information in Table 1 in response to the registration button being pressed. Also, if the input card ID is already registered, the items other than the card ID of the user information may be updated with the new set values.

Note that when inputting in FIG. 5B, in particular, when inputting the passcode or pattern 525, the compulsory passcode only setting 510 and the compulsory pattern only setting 511 may be referenced. For example, if the compulsory passcode only setting 510 is on, display of a second factor registration screen 602 may be skipped, a passcode registration screen 603 may be displayed, and a passcode may be made to be registered without no option to select. In a similar manner, if the compulsory pattern only setting 511 is on, display of the second factor registration screen 602 may be skipped, a pattern registration screen 605 may be displayed, and a pattern may be made to be registered without no option to select.

A method for registering a value for a second factor corresponding to the target of a passcode or pattern authentication corresponding to a second factor in multi-factor authentication will now be described using FIGS. 6A to 6F. In the example described herein, as in the server authentication screen 501 of FIG. 5A displayed on the image forming apparatus 100, the first factor is card ID and the second factor is passcode or pattern. In other words, the second factor of FIG. 5B may be read by passcode or pattern.

Figure 6A:
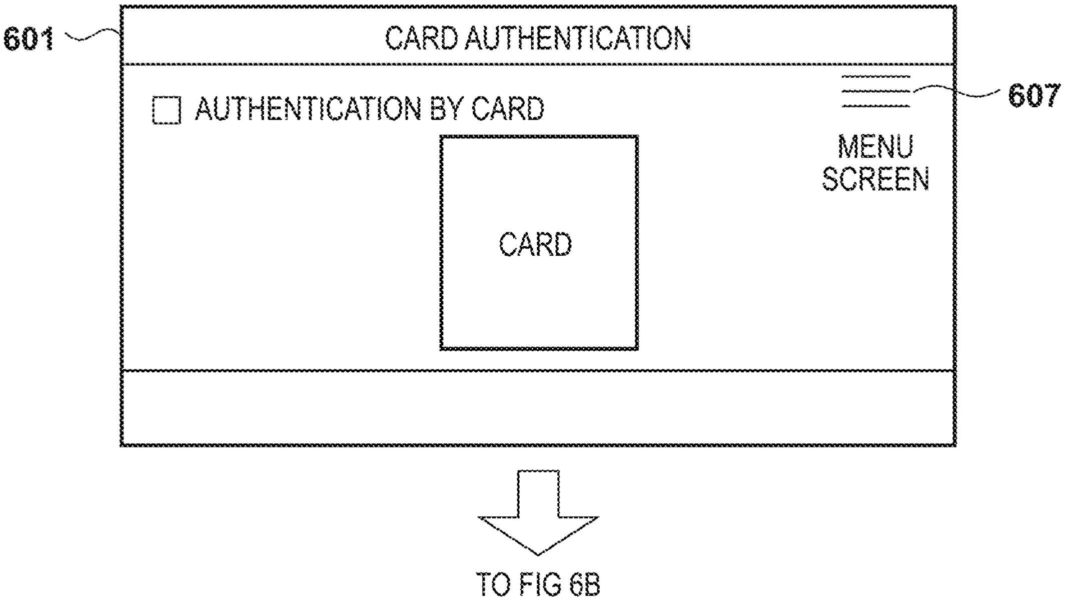
FIGS. 6A-6F are diagrams illustrating a second attribute value registration screens.
Figure 6B:
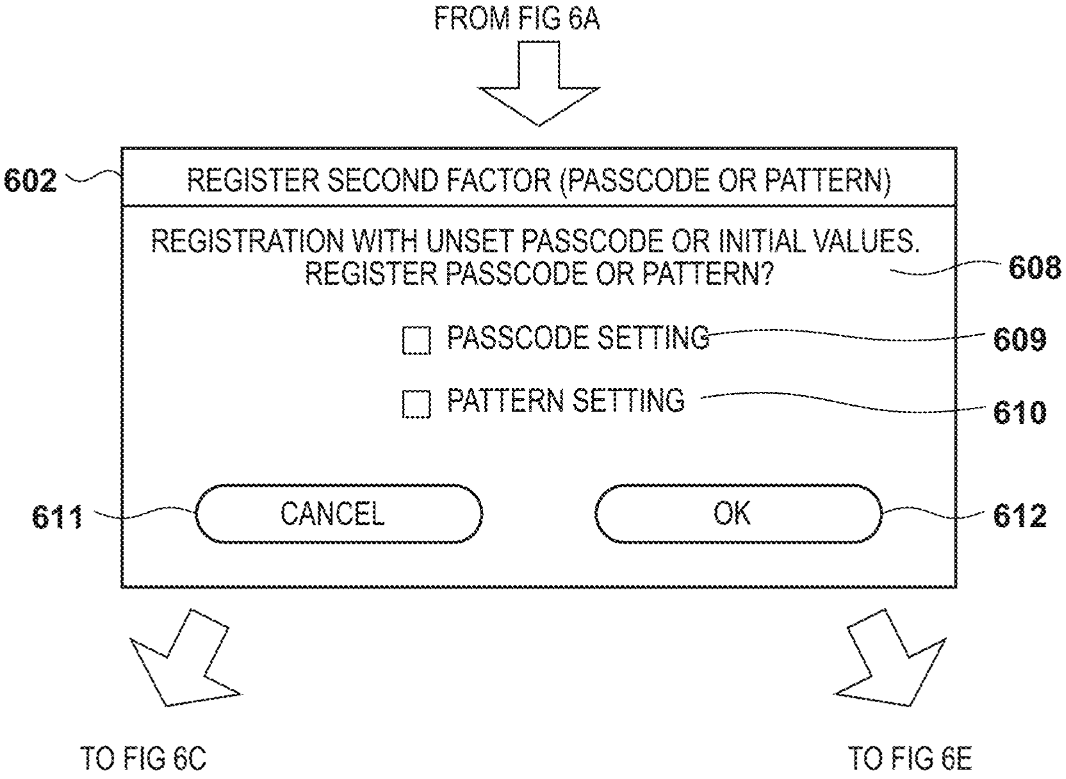

When the administrator user selects the passcode or pattern 525 of the user settings screen 521, a card authentication screen 601 is displayed (FIG. 6A). The card authentication screen 601 displayed at this time includes a menu portion 607. When the user presses the menu portion 607, the screen transitions to the second factor registration screen 602 for passcode and pattern registration (FIG. 6B). Via the second factor registration screen 602, the user selects the target for registration as the second factor from either passcode or pattern and presses an OK button 612 after selection. Note that in the diagram, checkboxes are used for selection, but radio buttons may be used for exclusive selections. In this manner, attribute value registration processing corresponding to the method selected in this manner is started. If the cancel button is pressed, the screen transitions to the card authentication screen 601.

Figure 6C:
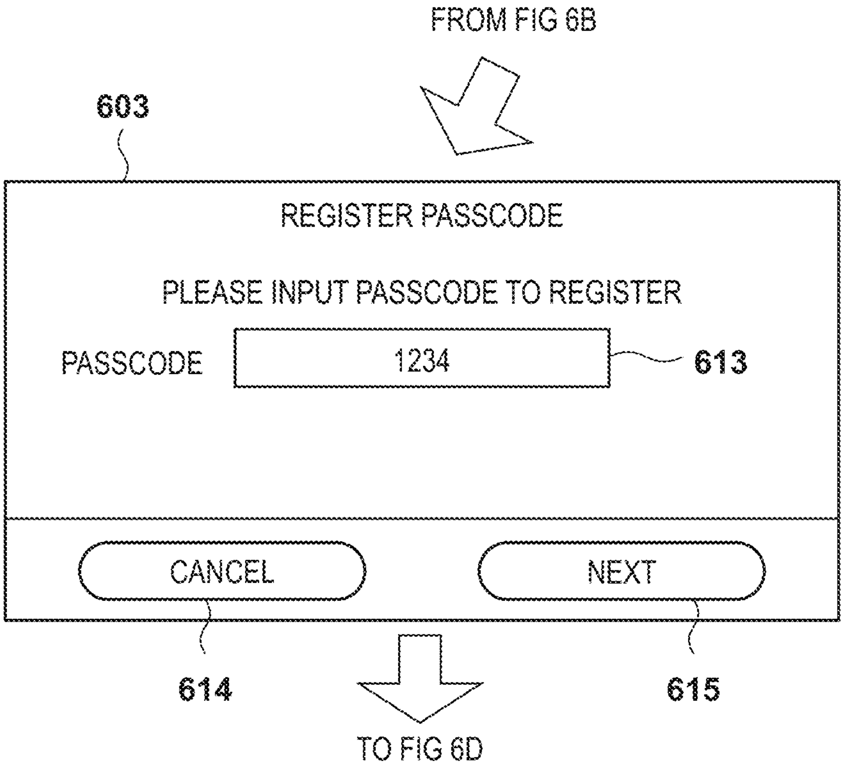
Figure 6D:
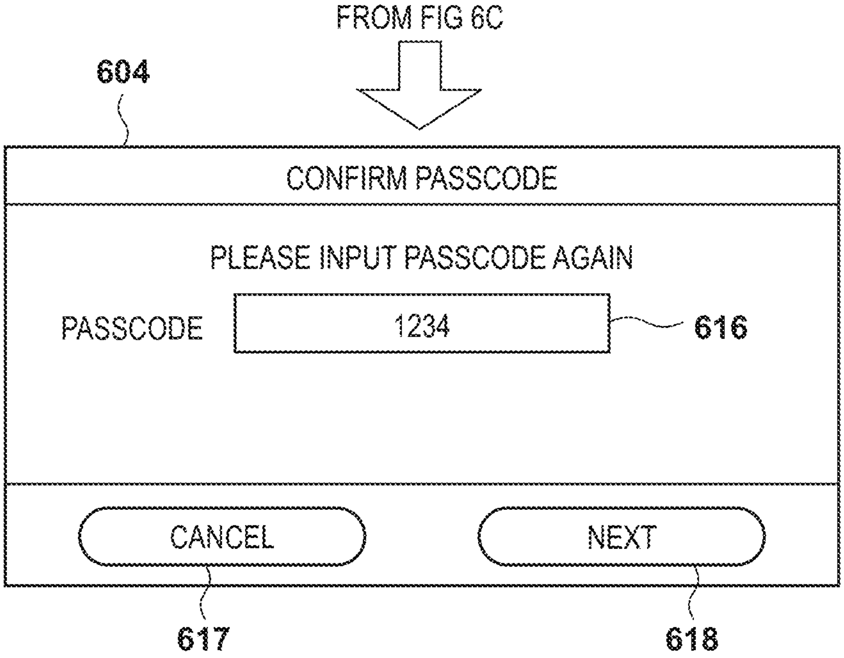

On the second factor registration screen 602, in a case where a passcode setting 609 is selected, the screen transitions to the passcode registration screen 603 (FIG. 6C). After, the passcode to be registered is input and a next button 615 is pressed, the screen transitions to a passcode confirmation screen 604 (FIG. 6D). If a cancel button 614 is pressed, the screen transitions to the card authentication screen 601. When confirmation input on the passcode confirmation screen 604 is performed and an OK button 618 is pressed, the image forming apparatus compares the value input into the passcode registration screen 603 and the confirmation input value. In a case where the result of the comparison shows that the values match, the image forming apparatus executes registration processing for hash data with a passcode prefix such as that illustrated in Table 1 for the authentication server 104. In a case where the values do not match, an error screen is displayed and the screen transitions to the passcode confirmation screen 604. If a cancel button 617 is touched, the screen transitions to the card authentication screen 601. When performing registration, the user information of the authentication server 104 is searched for using the read card ID, and if already registered, the user passcode is rewritten with the newly set passcode. If unregistered, the card ID is of a user to be newly registered. Thus, a new record for the user information is added and values set there are registered. In this case, if items required, such as username and user privilege, are not input, registration is not performed, and registration may be performed after all of these items are input.

Figure 6E:
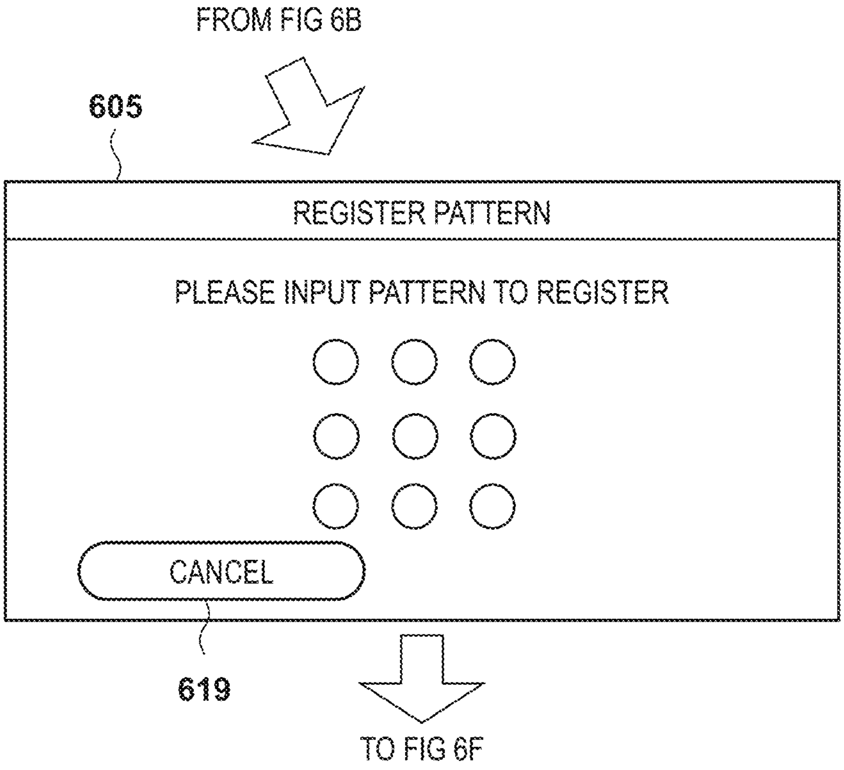
Figure 6F:
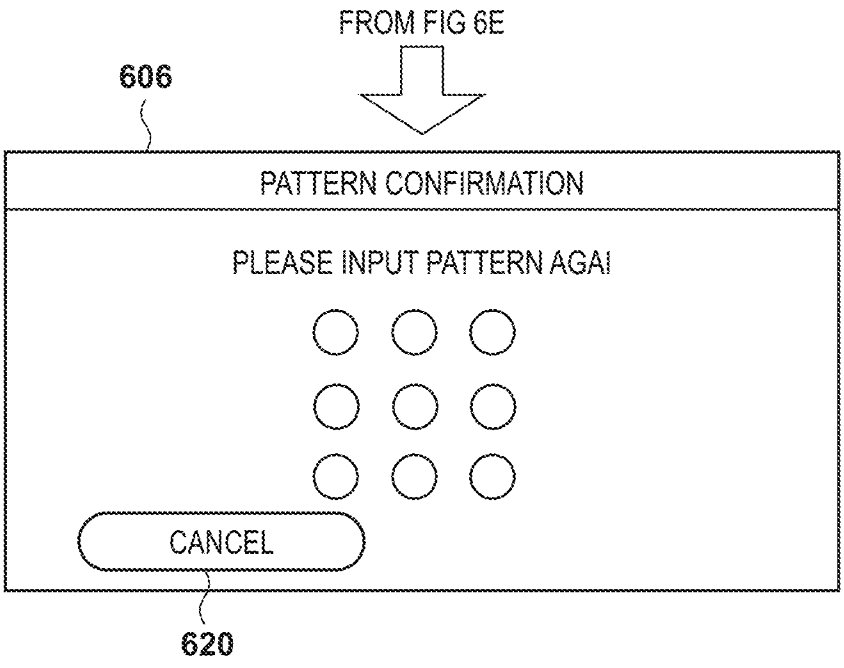

In a case where a pattern setting 610 is selected on the second factor registration screen 602, the screen transitions to the pattern registration screen 605 (FIG. 6E). After the pattern to register is input, the screen transitions to a pattern confirmation screen 606 (FIG. 6F). If a cancel button 619 is pressed, the screen transitions to the card authentication screen 601. When confirmation input on the pattern confirmation screen 606 is performed, the image forming apparatus compares the value input on the pattern registration screen 605 and the confirmation input value. In a case where the result of the comparison shows that the values match, the image forming apparatus executes registration processing for hash data with a pattern prefix such as that illustrated in Table 1 for the authentication server. In a case where the values do not match, an error screen is displayed and the screen transitions to the pattern confirmation screen 606. If a cancel button 620 is touched, the screen transitions to the card authentication screen 601. When performing registration, the user information of the authentication server 104 is searched for using the read card ID, and if already registered, the user passcode is rewritten with the newly set passcode. If unregistered, the card ID is of a user to be newly registered. Thus, a new record for the user information is added and values set there are registered. In this case, if items required, such as username and user privilege, are not input, registration is not performed, and registration may be performed after all of these items are input.

If registration and update of the passcode or pattern is complete, the screen returns to the user settings screen 521 of FIG. 5B.

Note that if the information is the user's personal information, a user without administrator privileges can edit already registered user information instead of the administrator user. However, the items that can be edited are limited. For example, the user may be able to change the password attribute and the passcode or pattern attribute instead of the administrator user. A user who has logged in with general user privileges that are not administrator privileges can obtain the user information of the logged in user from the authentication server 104 by running the user authentication setting application 304 and sending a user information editing instruction. The user authentication setting application 304 is used for obtaining. Then, the obtained values are displayed on the screen of FIG. 5B. Regarding items that cannot be changed, they are grayed out or the like and put in an unchangeable state. When the passcode or pattern attribute is selected, the second factor registration screen 602 of FIG. 6B is displayed as described above. In this manner, a user with administrator privileges can designate their own information to use as the second factor in multi-factor authentication. In this example, either passcode or pattern can be selected. Also, the selected information can be registered in the user's user information.

Description of Flow According to the Present Disclosure

Next, the flow of server authentication processing executed by the CPU 206 of the image forming apparatus according to the present embodiment by loading a program stored in the ROM 203 on the RAM 204 will be described using the flowchart of FIG. 7. Also, the flowchart according to the present embodiment is a multi-factor authentication process. In this flow, after card authentication, the first factor, is executed, passcode or pattern authentication, the second factor, is executed.

Server Authentication Processing Flow when Multi-Factor Authentication is Enabled The flow of multi-factor authentication using the authentication server 104 by a user registered in the authentication server 104 will be described below. When user authentication is performed, whether the compulsory multi-factor authentication settings 509 is on is determined. If it is on, the processing of FIG. 7 is executed. Also, if it is off, user authentication is performed via a predetermined or designated authentication method such as user account authentication or the like.

When executing multi-factor authentication, the image forming apparatus 100 displays the IC card authentication screen 401. This display may be performed in response to a login operation by a user who is not logged in. At this screen, the IC card is read and the card ID is transmitted to the authentication server 104. If corresponding user information exists, the authentication server 104 transmits an IC card authentication success response to the image forming apparatus 100.

The IC card authentication success response is received from the authentication server 104 (S700). Accordingly, a first authentication relating to the first factor of multi-factor authentication is determined to be a success. Thereafter or coinciding with, the image forming apparatus 100 obtains the attribute value of the second factor of the login user from the authentication server 104 (S701). The second factor to obtain is the attribute set as the second factor 508 in the server authentication settings information. Here, it is passcode or pattern information of the user corresponding to the card ID authenticated in the IC card authentication. When an IC card authentication is requested, information indicating which attribute is the second factor may be transmitted to the authentication server 104, and the authentication server 104 may transmit the attribute value of the second factor corresponding to the card ID together with a success response to the image forming apparatus 100. After the attribute value registered as the second factor is obtained, first, confirmation of the prefix is executed (S702). In the present example, a prefix indicating a passcode or a pattern is attached to the obtained passcode or pattern. In S702, which one it is determined.

In a case where the result of the prefix determination is "PIN", the image forming apparatus 100 displays the passcode authentication screen 403 (S703). Input of the passcode by the user is received via the displayed passcode authentication screen 403 (S704). After this is input, the image forming apparatus 100 hashes the input passcode data (S705). The hashed passcode data and the attribute value of the second factor, that is, the hash data registered in the user information obtained in S701, are compared, and whether the values match is determined (S706). In a case where the values match, a second authentication for the second factor is successful, and as the multi-factor authentication has been successful, a post-authentication screen is displayed (S713). An authenticated user is allowed to use the image forming apparatus according to the image forming apparatus privileges. In a case where the values do not match, a login error (S707) occurs, and a pre-login screen is displayed.

On the other hand, in S702, in a case where the result of the prefix determination is "PTN", the image forming apparatus 100 displays the pattern authentication screen 404

(S708). Input of the pattern by the user is received via the displayed pattern authentication screen 404 (S709). After this is input, the image forming apparatus 100 hashes the input pattern data (S710). The hashed pattern data and the attribute value of the second factor, that is, the hash data registered in the user information obtained in S701, are compared, and whether the values match is determined (S711). In a case where the values match, a second authentication for the second factor is successful, and as the multi-factor authentication has been successful, a post-authentication screen is displayed (S713). In a case where the values do not match, a login error (S712) occurs, and a pre-login screen is displayed. Note that in S711, the hash data registered in the user information to be compared may be the data obtained in S701.

With the process described above, the user can register whether to use a passcode or a pattern as a factor in the multi-factor authentication. Also, when registration to the authentication server 104 is performed, what kind of information is the information registered when authentication was performed can be determined by attaching a prefix corresponding to the selected information, and authentication can be performed using a method in accordance with the determination result.

With an image forming apparatus that performs user authentication using two factor authentication as an example of multi-factor authentication, for example, a user authenticated via the first authentication and the second authentication becomes a login user. The login user performs an operation to request a list of print jobs stored in the server associated with the user together with the user ID, for example, via the user interface of the image forming apparatus. The image forming apparatus request the list of print jobs from the server. When the server receives the request, the server transmits the list of print jobs stored associated with the received user ID in response to the request to the image forming apparatus.

When the image forming apparatus receives this, the image forming apparatus displays the list of print jobs on the user interface. The login user selects the desired print job from the displayed list and inputs an operation for performing printing. In response to this operation, the image forming apparatus transmits a request for the selected print job to the server. When the server receives this request, the server transmits the requested print job to the image forming apparatus. When the image forming apparatus receives the print job, the image forming apparatus automatically or in response to a printing instruction operation by the user executes the print job and performs printing.

This is an example of the processing that can be executed by a user who has been successfully authenticated. Other examples of what the login user can do include editing including changing the password, pattern, or the like referenced in the second authentication and changing or deleting the authentication method used in the second authentication. Also, a user logged in from a client terminal can transmit a print job to the server and register and store a print job in the server. When the server receives a print job associated with a user ID of the login user from the client terminal, the server stores the print job in association with the user ID. Then, regarding the print job, access is allowed for the user who has been authenticated via multi-factor authentication or the like, for example, and is associated with the print job.

According to the embodiment described above, when executing multi-factor authentication using the authentication server, even in a case where there are a plurality of second factor authentication methods, authentication can be executed using an authentication method selected by the user. In this manner, computer safety via multi-factor authentication and user-friendliness are both achieved, and computer technology or technology relating to an image forming apparatus using a computer is enhanced. This also applies to the second embodiment and third embodiment.

Second Embodiment

Authentication Flow when Value of Second Attribute Value is not Hash Data with Prefix The flow described above is a login flow in a case where hash data with a prefix is already registered in the authentication server 104. In the present embodiment, the login flow will be described using FIG. 8 for cases such as when a passcode or pattern corresponding to the second factor is registered as raw data in the authentication server 104 by the administrator and when a value is not registered for the passcode or pattern corresponding to the second factor. Note that the configurations, processes, and the like are generally the same as in the first embodiment except that FIG. 7 of the first embodiment is changed to FIG. 8.

When executing authentication, the image forming apparatus 100 displays the IC card authentication screen 401. This display may be performed in response to a login operation by a user who is not logged in. At this screen, the IC card is read and the card ID is transmitted to the authentication server 104. If corresponding user information exists, the authentication server 104 transmits an IC card authentication success response to the image forming apparatus 100.

When an IC card authentication success response is received from the authentication server 104 (S800), the image forming apparatus 100 obtains the second factor of the login user from the authentication server 104 (S801). This point may be the same as described in S701 of FIG. 7. Whether the attribute value corresponding to the obtained second factor is a value that can be used for second factor authentication is determined (S802). Being able to be used as the second factor means that an attribute value designated as the second factor has been obtained. For example, in a case where all of the unset attributes in the user information are set to 0, if all of the obtained second factors are 0, it can be determined that they cannot be used. Otherwise, it may be determined that they can be used.

In a case where it is determined that they can be used in S802, whether the registration data is raw data is determined (S803). Herein, raw data means raw that has not been hashed. In the present embodiment, a second factor is a passcode or pattern attribute, and unhashed raw data is limited to a passcode directly set from the authentication server 104. In a case where an unhashed passcode is set as a character string of numerals, if the value of the passcode or pattern attribute is unset, it is 0, and if it is set, the front section is prefix text or passcode text. Here, if the passcode or pattern attribute obtained as the second factor is not 0 and there is no prefix, the value can be determined to be unhashed raw data.

In a case where the registration data is determined to be raw data in S803, the image forming apparatus 100 displays the passcode authentication screen 403 (S804). User passcode input processing is received via the displayed passcode authentication screen 403 (S805). After input, the input passcode data is compared with the data obtained in S801, and whether the values match is determined (S806). In a case where the values do not match, a login error (S808) occurs, and a pre-login screen is displayed.

In a case where it is determined that the values match in S806, the authentication is successful. However, in this case, to re-register the hash data including a prefix, the passcode or pattern registration screen 602 is displayed (S807). After the passcode or pattern registration screen 602 is displayed, the image forming apparatus 100 hashes the value using the authentication method selected by the user and attaches a prefix corresponding to the selected authentication method (S809). This data is then registered in the authentication server 104 as hash data with a prefix (S810). After second attribute value update/registration to the authentication server is complete, the image forming apparatus 100 displays a post-authentication screen (S811).

Note that input of a passcode in S807 may start with the selection of a passcode on the passcode or pattern registration screen 602 described using FIG. 6B and be performed via the passcode registration screen 603 and the passcode confirmation screen 604. In a similar manner, input of a pattern in S807 may start with the selection of a pattern on the passcode or pattern registration screen 602 as described using FIG. 6B and be performed via the pattern registration screen 605 and the pattern confirmation screen 606.

Figure 7:
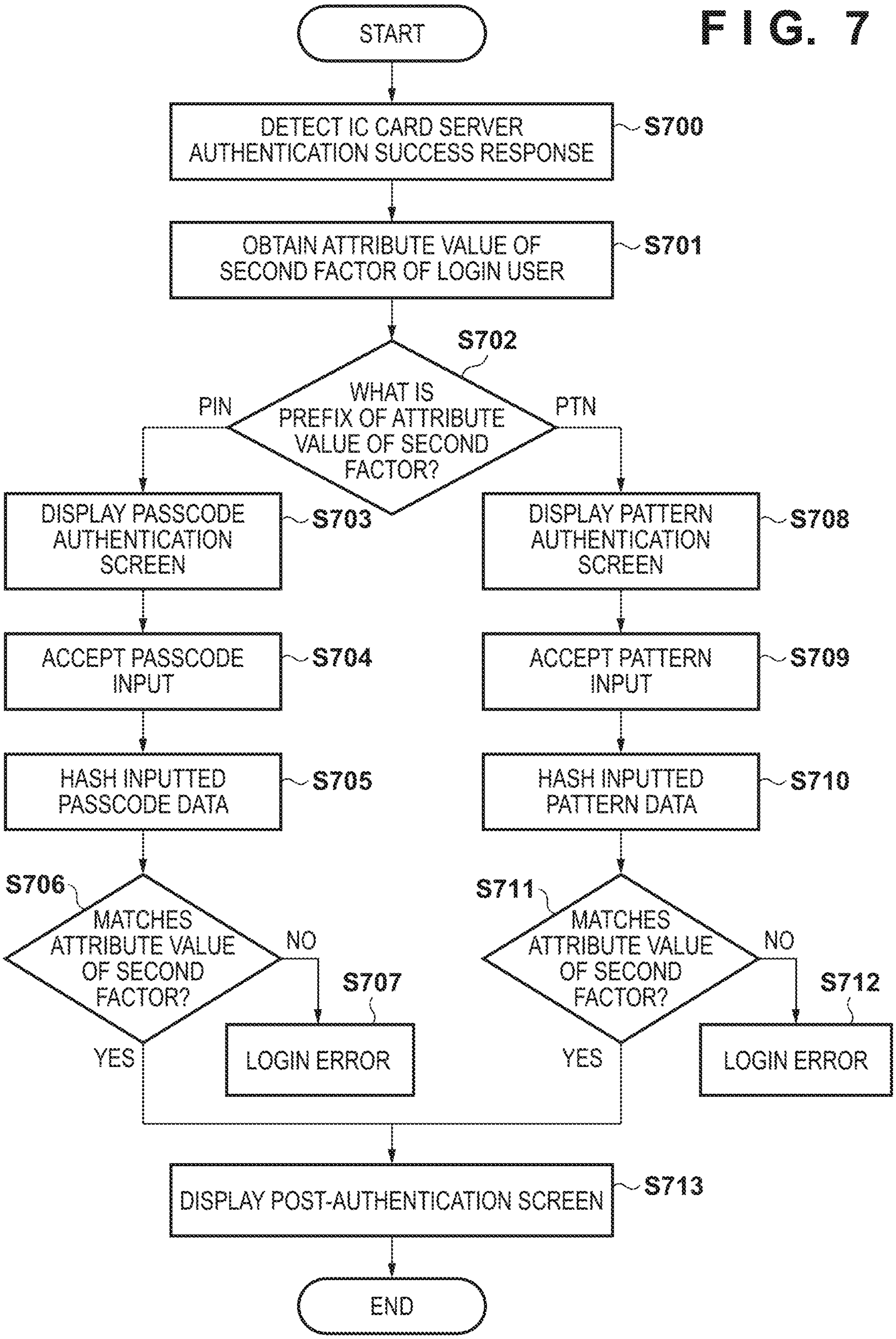
FIG. 7 is a flow diagram of server authentication processing performed when multi-factor authentication is enabled.

In a case where the registration data is determined to not be raw data but be hash data with a prefix in S803, the processing of S702 to S712 of FIG. 7 is executed. In other words, second factor authentication is performed as described using FIG. 7.

In a case where, in S802, the attribute value for the obtained second factor is determined to not be a value that can be used as the second factor in multi-factor authentication, the process branches to S807. In this case, the second factor authentication is not performed, and the user is made to register an attribute corresponding to the second factor. Accordingly, the user can register a passcode or a pattern as described above.

With the process described above, in a case where a passcode corresponding to the second factor is registered as unedited raw data, after performing authentication using that passcode, the user can re-register the input passcode or pattern. The format used at this time includes being hashed and a prefix attached. Thus, in subsequent authentications, multi-factor authentication can be smoothly performed using the passcode or pattern registered by the user as the second factor.

Also, in a case where a passcode or pattern corresponding to the second factor is not registered to be usable as the second factor in at least multi-factor authentication, the user can register a passcode or a pattern. In subsequent authentications, multi-factor authentication can be smoothly performed using the passcode or pattern registered by the user as the second factor.

Third Embodiment

Next, a process will be described using FIGS. 9A and 9B in which, in a case where the compulsory multi-factor authentication settings 509 is on, the compulsory passcode only setting 510 and the compulsory pattern only setting 511 are taken into account and the user is made to set the attribute value for the authentication process which is set to compulsory.

Figure 8:
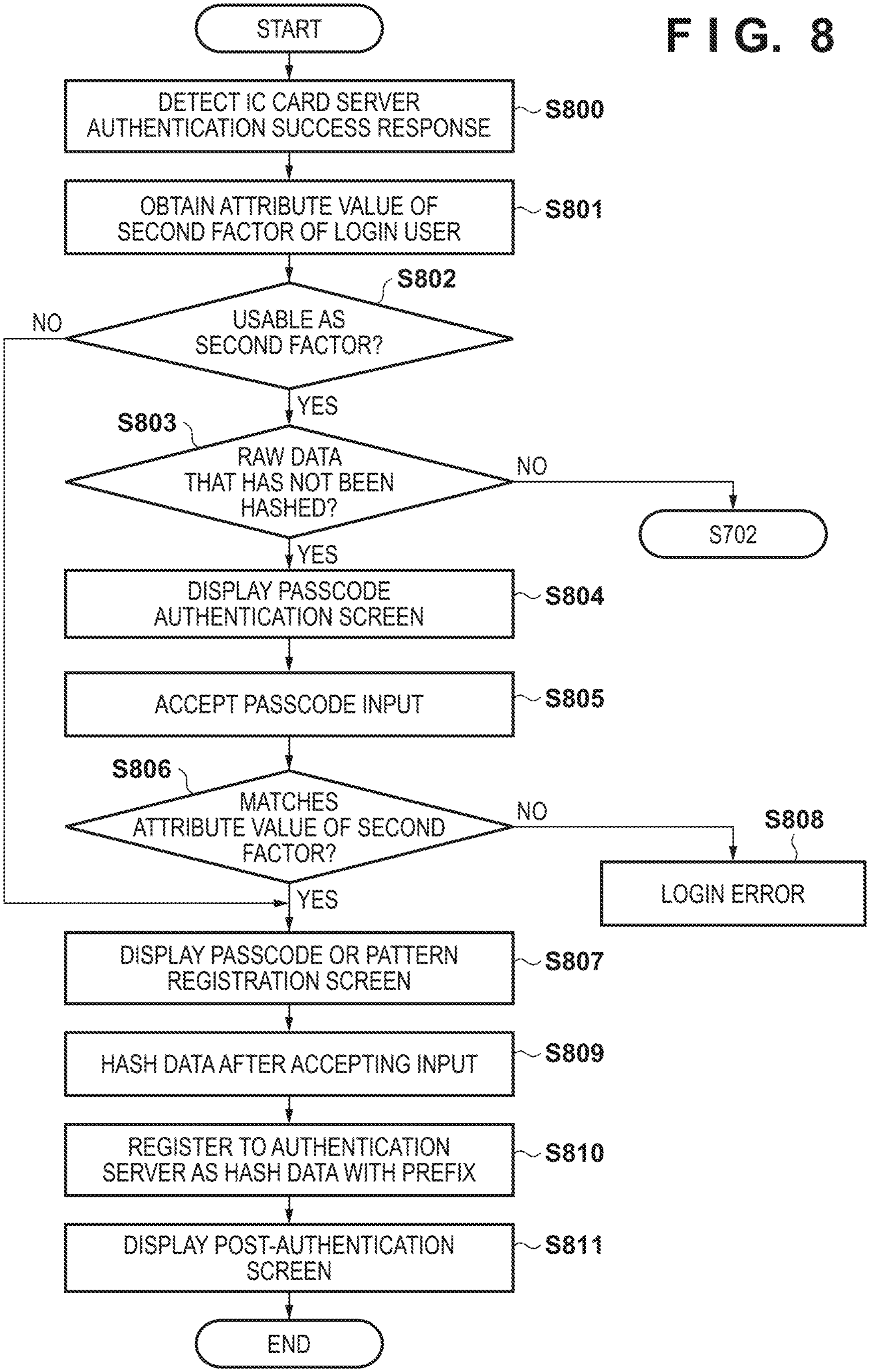
FIG. 8 is a flow diagram of when the second attribute value is not hash data with a prefix.

FIGS. 9A1 and 9A2 are different from FIG. 8 in that S807 to S810 of FIG. 8 are substituted with S900, which is described in detail using FIGS. 9B1 and 9B2, and after the branch at S702, after successful authentication and completion of a post-authentication screen display, the process branches to S900. In S900, the user is prompted to register an attribute value in accordance with the compulsory passcode or pattern setting and the value currently set for the "passcode or pattern" attribute of the user information. Accordingly, after authentication relating to the second factor, if either passcode or pattern is set to compulsory, input of the compulsory attribute value can be made to be performed as necessary. Except for the differences described above, FIGS. 9A1 and 9A2 are the same as FIG. 8. Thus, description will be omitted except in relation to S900.

FIGS. 9B1 and 9B2 show a flowchart illustrating the details of S900 of FIG. 9A1. First, it is determined what is the prefix of the attribute value obtained in S801, that is, the value of the passcode or pattern attribute of the user information of the logged in user (S901). The prefix is either (PTN) for a pattern or (PIN) for a passcode, but it may be not set in the case of the raw data of a passcode. In a case where the prefix is determined to be PTN, a pattern is set for the passcode or pattern attribute of the user information of the login user. Then, whether the compulsory passcode only setting 510 is set to on is determined (S902).

If the compulsory passcode only setting 510 is not on, the second factor of the multi-factor authentication may be a pattern, and thus the passcode or pattern registration processing ends. If the compulsory passcode only setting 510 is on, the second factor of the multi-factor authentication must be a passcode and not a pattern. Thus, a passcode is made to be set instead of a pattern for the user information of the login user. Here, the passcode registration screen 603 is displayed and a passcode is input (S903), and then the passcode confirmation screen 604 is displayed and the passcode is re-input (S904). After confirmation, the process proceeds to S905.

Then, the input and confirmed data is hashed (S905), transmitted via a registration request for the authentication server 104 as hash data with a prefix, and registered in the authentication server 104 as a value for the passcode or pattern attribute (S906).

On the other hand, in a case where the prefix is determined to not be PTN in S901, a pattern is not set for the passcode or pattern attribute of the user information of the login user. Then, whether the compulsory pattern only setting 511 is set to on is determined (S907). If the compulsory pattern only setting 511 is on, the process branches to S910. If the compulsory pattern only setting 511 is on, the second factor of the multi-factor authentication must be a pattern. Thus, a pattern is made to be set instead of data for the user information of the login user. Here, the pattern registration screen 605 is displayed and a pattern is input (S908), and then the pattern confirmation screen 606 is displayed and the pattern is re-input (S909). After confirmation, the process proceeds to S905.

Then, the input and confirmed data is hashed (S905), transmitted via a registration request for the authentication server 104 as hash data with a prefix, and registered in the authentication server 104 as a value for the passcode or pattern attribute (S906).

In a case where it is determined that the compulsory pattern only setting is not on in S907, whether the PIN prefix is attached to the attribute value of the second factor is determined (S910). If the prefix is PIN, the compulsory pattern only setting 511 is not on and a passcode is set as the passcode or pattern attribute for the second factor. Thus, passcode or pattern registration processing ends.

In a case where it is determined that the prefix is not PIN in S910, whether the value of the passcode or pattern attribute, which is the second factor, is raw data set in the authentication server 104 is determined (S911). In a case where it is determined to be passcode raw data, the process branches to S903 and the passcode is made to be re-set.

In a case where it is determined that it is not passcode raw data in S911, it can be determined that a passcode or pattern attribute is not set. In this case, a passcode or a pattern is made to be set. Then, first, it is determined whether the compulsory passcode only setting 510 is on (S912). In a case where it is determined that the compulsory passcode only setting 510 is on, the process branches to S903 and a passcode is made to be set. In a case where it is determined that the compulsory passcode only setting 510 is not on, the passcode or pattern registration screen 602 is displayed and a selection of one is accepted (S913). If passcode is selected, the process branches to S903, and a passcode is made to be input and registered in the authentication server 104. If pattern is selected, the process branches to S908, and a pattern is made to be input and registered in the authentication server 104.

Via the process described above, in a case where a hashed passcode is registered in the user information as the second factor, in a case where a hashed pattern is registered, in a case where a plaintext passcode is registered, and in a case where nothing is registered, re-registration can be performed as necessary. As necessary includes in its meaning in accordance with compulsory passcode only, compulsory pattern only, or neither being compulsory settings. Thus, an authenticated user can re-set their user information as appropriate to match the set conditions. Also, in particular if neither is compulsory setting, this can be set in accordance with the user selection.

Effect of Embodiment

According to the embodiment described above, when executing multi-factor authentication using the authentication server, even in a case where there are a plurality of second factor authentication methods, authentication can be executed using an authentication method selected by the user. This can enhance the user-friendliness of the image forming apparatus.

Also, in a case where there is no room for selection by the user in regards to the second factor, if the current registration contents and the compulsory authentication method conflict with one another, the appropriate information can be registered when user authentication is performed.

Note that in the embodiment described above, server authentication using an authentication server was described. However, the first to third embodiments described above can be applied to a configuration without a server in which the image forming apparatus stores the user information.

Also, in the first to third embodiments, the user information is registered on the screens illustrated in FIGS. 5B and 6A to 6F. However, an item may be selected on the screen of FIG. 5A, and user information may be registered from the screens of FIGS. 6A to 6F in accordance with this selected item.

OTHER EMBODIMENTS

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-124708, which was filed on Jul. 31, 2023 and which is hereby incorporated by reference herein in its entirety.

What is claimed is:

1. An information processing apparatus comprising:

a user interface for displaying screens and for user input;

at least one memory storing instructions; and at least one processor that is in communication with the at least one memory and that, when executing the instructions, cooperates with the at least one memory to execute processing that includes:

performing a first authentication that includes comparing, from user information including a plurality of attributes for each user, a first attribute value of a user to be authenticated, as a first factor, to a first input value from a respective user input, wherein the first attribute value is card identification information read from a card;

after the first authentication is successful, obtaining, from the user information, a second attribute value corresponding to the user for which the first authentication was successful, wherein the second attribute value is either a passcode or a pattern, and wherein the second attribute value is stored in an identical region to the user information;

determining a type of the second attribute value based on information indicating the type included in the second attribute value, wherein the information indicating the type included in the second attribute value is information indicating whether the second attribute value stored in the region is a passcode or a pattern;

selecting a user interface screen for a second authentication from among a plurality of user interface screens based on the determined type and displaying the user interface screen on the user interface;

accepting an input corresponding to the determined type;

after accepting the input corresponding to the determined type, performing the second authentication, which includes comparing the second attribute value of corresponding to the user for which the first authentication was successful, as a second factor, to a second input value from a respective user input; and allowing use corresponding to privileges of an authenticated user to a user for which the second authentication was successful.

2. The information processing apparatus according to claim 1, wherein the processing further includes:

in a case where the second attribute value does not include information indicating the type but the type can be identified, displaying a user interface screen corresponding to the identified type of the second attribute value on the user interface, and accepting an input corresponding to the identified type.

3. The information processing apparatus according to claim 2, wherein the processing further includes:

if the second authentication is successful, displaying a user interface screen corresponding to the identified type of the second attribute value on the user interface, and accepting an input corresponding to information indicating the type; and re-registering, based on the input corresponding to information indicating the type, the second attribute value including the information indicating the type.

4. The information processing apparatus according to claim 1, wherein the processing further includes:

in a case where the second attribute value is not set, accepting a selection of a type of the second attribute value by a user, displaying a user interface screen corresponding to the selected type of the second attribute value on the user interface, and accepting an input corresponding to information indicating the type, and re-registering, based on the input corresponding to information indicating the type, the second attribute value including the information indicating the type.

5. The information processing apparatus according to claim 1, wherein the processing further includes:

in a case where the second authentication is successful, if the type of the second attribute value is determined and the second attribute value corresponding to the user is not the determined type, displaying a user interface screen corresponding to the determined type on the user interface, and accepting an input corresponding to the determined type, and based on the input corresponding to the determined type, re-registering the second attribute value including information indicating the determined type.

6. The information processing apparatus according to claim 1, further comprising:

an image forming device.

7. The information processing apparatus according to claim 1, further comprising:

a communication device, wherein the processing further includes obtaining the user information from an authentication server via the communication device.

8. An authentication system comprising:

an information processing apparatus; and an authentication server, wherein the authentication server includes at least one first memory storing instructions, and at least one first processor that is in communication with the at least one first memory and that, when executing the instructions, cooperates with the at least one first memory to execute processing that includes:

storing user information including a plurality of attributes for each user;

receiving a first input value from the information processing apparatus;

performing a first authentication that includes comparing, from the user information, a first attribute value of a user to be authenticated, as a first factor, to the first input value, wherein the first attribute value is card identification information read from a card; and sending a result of the first authentication to the information processing apparatus, wherein the information processing apparatus includes a communication device, a user interface for displaying screens and for user input, at least one second memory storing instructions, and at least one second processor that is in communication with the at least one second memory and that, when executing the instructions, cooperates with the at least one second memory to execute processing that includes:

obtaining the first input value from a respective user input and sending the first input value to the authentication server;

obtaining the result of the first authentication from the authentication server;

in a case where the result of the first authentication indicates that the first authentication is successful, obtaining, from the authentication server, a second attribute value corresponding to the user for which the first authentication was successful, wherein the second attribute value is either a passcode or a pattern, and wherein the second attribute value is stored in an identical region to the user information;

determining a type of the second attribute value based on information indicating the type included in the second attribute value, wherein the information indicating the type included in the second attribute value is information indicating whether the second attribute value stored in the region is a passcode or a pattern;

selecting a user interface screen for a second authentication from among a plurality of user interface screens based on the determined type and displaying the user interface screen on the user interface;

accepting an input corresponding to the determined type;

after accepting the input corresponding to the determined type, performing the second authentication, which includes comparing the second attribute value corresponding to the user for which the first authentication was successful, as a second factor, to a second input value from a respective user input; and allowing use corresponding to privileges of an authenticated user to a user for which the second authentication was successful.

9. A non-transitory computer-readable storage medium storing computer-executable instructions that, when executed by a computer that includes a user interface for displaying screens and for user input, cause the computer to execute processing that includes:

performing a first authentication that includes comparing, from user information including a plurality of attributes for each user, a first attribute value of a user to be authenticated, as a first factor, to a first input value from a respective user input, wherein the first attribute value is card identification information read from a card;

after the first authentication is successful, obtaining, from the user information, a second attribute value corresponding to the user for which the first authentication was successful, wherein the second attribute value is either a passcode or a pattern, and wherein the second attribute value is stored in an identical region to the user information;

determining a type of the second attribute value based on information indicating the type included in the second attribute value, wherein the information indicating the type included in the second attribute value is information indicating whether the second attribute value stored in the region is a passcode or a pattern;

selecting a user interface screen for a second authentication from among a plurality of user interface screens based on the determined type and displaying the user interface screen on the user interface;

accepting an input corresponding to the determined type;

after accepting the input corresponding to the determined type, performing the second authentication, which includes comparing the second attribute value corresponding to the user for which the first authentication was successful, as a second factor, to a second input value from a respective user input; and allowing use corresponding to privileges of an authenticated user to a user for which the second authentication was successful.

10. An authentication method executed by an information processing apparatus including an interface for displaying screens and for user input, the method comprising:

performing a first authentication that includes comparing, from user information including a plurality of attributes for each user, a first attribute value of a user to be authenticated, as a first factor, to a first input value from a respective user input, wherein the first attribute value is card identification information read from a card;

after the first authentication is successful, obtaining, from the user information, a second attribute value corresponding to the user for which the first authentication was successful, wherein the second attribute value is either a passcode or a pattern, and wherein the second attribute value is stored in an identical region to the user information;

determining a type of the second attribute value based on information indicating the type included in the second attribute value, wherein the information indicating the type included in the second attribute value is information indicating whether the second attribute value stored in the region is a passcode or a pattern;

selecting a user interface screen for a second authentication from among a plurality of user interface screens based on the determined type and displaying the user interface screen on the interface;

accepting an input corresponding to the determined type;

after accepting the input corresponding to the determined type, performing a second authentication, which includes comparing the second attribute value of corresponding to the user for which the first authentication was successful, as a second factor, to a second input value from a respective user input; and allowing use corresponding to privileges of an authenticated user to a user for which the second authentication was successful.

* * * * *